(12) United States Patent
Cody et al.

(10) Patent No.: US 6,881,784 B2
(45) Date of Patent: Apr. 19, 2005

(54) METHODS FOR PRODUCING SUBMICRON POLYTETRAFLUOROETHYLENE POWDER AND PRODUCTS THEREOF

(76) Inventors: Charles A. Cody, 11 Stanley Dr., Robbinsville, NY (US) 08691; William Neuberg, 30 Bittner Rd., Perrineville, NJ (US) 08644; Manshi Sui, 65 Wesley Rd., Hillsborough, NJ (US) 08844; Youssef Awad, 12 Driscoll Ct., North Brunswick, NJ (US) 08902

( * ) Notice: Subject to any disclaimer, the term of this patent is extended or adjusted under 35 U.S.C. 154(b) by 173 days.

(21) Appl. No.: 10/389,569

(22) Filed: Mar. 14, 2003

(65) Prior Publication Data

US 2004/0026805 A1 Feb. 12, 2004

Related U.S. Application Data

(60) Provisional application No. 60/364,565, filed on Mar. 14, 2002.

(51) Int. Cl.[7] .............................. C08K 3/20; C08K 5/02; B02B 5/02; B32B 15/02
(52) U.S. Cl. ........................ 524/794; 524/792; 524/795; 241/25; 241/29; 428/402
(58) Field of Search ................................ 264/405–496, 264/109–128; 524/792, 794, 795; 241/25, 29; 428/402

(56) References Cited

U.S. PATENT DOCUMENTS

| | | | |
|---|---|---|---|
| 3,766,031 A | 10/1973 | Dillon | |
| 4,029,870 A | * 6/1977 | Brown et al. | ................ 526/255 |
| 4,748,005 A | 5/1988 | Neuberg | |
| 4,777,192 A | 10/1988 | Neuberg | |
| 4,888,122 A | 12/1989 | McCready | |
| 5,149,727 A | 9/1992 | Luniewski | |
| 5,181,268 A | 1/1993 | Chien | |
| 5,263,256 A | * 11/1993 | Trankiem | ................. 30/346.54 |
| 5,296,113 A | 3/1994 | Luniewski | |
| 5,891,573 A | * 4/1999 | Neuberg et al. | ............. 428/402 |
| 5,968,997 A | 10/1999 | Luniewski et al. | |
| 6,274,254 B1 | 8/2001 | Abys et al. | |

OTHER PUBLICATIONS

Willson, Industrial Lubrication and Tribology, 44:3–5 (Mar./Apr. 1992).
Hadley et al., Metal Finishing, 85:51–53 (Dec. 1987).
"Niflor Engineered Composite Coatings," Hay N., International, Ltd. (1989).

* cited by examiner

Primary Examiner—Stephen J. Lechert, Jr.
(74) Attorney, Agent, or Firm—Baker Bott LLP; Manu J. Tejwani

(57) ABSTRACT

A method for producing submicron polytetrafluoroethylene ("PTFE") powder in a free-flowing, readily dispersible form. The irradiated PTFE starting material is placed in a desired solvent and undergoes grinding until the PTFE particles reach submicron size. The submicron particles are subsequently recovered from the solvent and dried to form a powder that may have particles less than 1.00 μm in size. The dry PTFE powder may then be readily dispersed to submicron size into a desired application system. The submicron PTFE powder of this method is free-flowing, readily dispersible in various application systems, tends not to "dust" or self-agglomerate. Improved aqueous and organic dispersions of submicron PTFE particles may also be formed that display increased stability and require much less agitation than other processes of forming such dispersions. Such improved PTFE dispersions may be formed with or without the addition of surfactants, wetting agents, rheology modifiers, pH-adjusting agents, and the like.

17 Claims, 19 Drawing Sheets

METHODS FOR PRODUCING SUBMICRON POLYTETRAFLUOROETHYLENE POWDER AND PRODUCTS THEREOF

This application claims the benefit of Provisional application Ser. No. 60/364,565 filed Mar. 14, 2002.

FIELD OF THE INVENTION

The present invention generally relates to methods for producing submicron polytetrafluoroethylene (PTFE) powder. More particularly, the present invention relates to methods whereby submicron PTFE powder is formed with or without the addition of any surfactant, wetting agent, rheology agent, or pH-adjusting agent. In addition, the present invention relates to the submicron PTFE powder formed according to the methods disclosed herein, where the powder is free-flowing, is readily-dispersible in a chosen application system, has little tendency to self-agglomerate, and has little tendency to dust into the air upon handling. Further, the present invention relates to improved methods of dispersing PTFE particles to submicron size in aqueous and organic dispersion media as well as the dispersions formed according to such methods.

BACKGROUND OF THE INVENTION

Aqueous polytetrafluoroethylene (PTFE) dispersions comprising submicron PTFE particles and methods for making such submicron PTFE dispersions are generally known in the art. The submicron PTFE dispersions that result from processes known in the art are typically sold and used in their dispersed form and may be incorporated directly into a desired application system. In addition, such known submicron PTFE dispersions may be used as "master dispersions" or concentrated dispersions that may be diluted or let down to a desired final concentration in the application system of choice.

Typically, these known dispersions of submicron PTFE particles are formed via polymerization in water with the use of dispersing agents and mild agitation at elevated temperatures and pressures. However, many such known submicron PTFE dispersions are characteristically unstable over time and with changing temperature. In addition, these known submicron PTFE dispersions tend to coagulate over time and may be highly sensitive to physical agitation or mechanical handling, whereby they undergo smearing. Thus, a need exists for improved methods of forming submicron PTFE dispersions in aqueous and organic media.

Similarly to PTFE dispersions, dry PTFE powder products are known in the art and are generally available in the industry. Several manufacturers in the fluoropolymer industry produce PTFE powders, and some of these manufacturers describe the PTFE particle size in their powders as being "submicron" or capable of being dispersed to submicron size. Such PTFE powders that are known in the art and that relate to the methods and products of the present invention primarily include "fine powder" PTFE products (which are also known as PTFE coagulated dispersions, PTFE coagulated solids, or PTFE that is formed by emulsion or dispersion polymerization rather than suspension polymerization).

Such fine powder PTFE products, coagulated PTFE solids products, and PTFE products formed by emulsion polymerization typically consist of loose agglomerates of primary PTFE particles, wherein the primary particle size of the PTFE particles is less than 1.00 $\mu$m and may range from about 0.1 $\mu$m to about 0.5 $\mu$m. During solids recovery, the primary PTFE particles may be coagulated through the use of salts, such as ammonium carbonate, in a process known as "salting out," through pH adjustments, through chemical neutralization with the use of a surfactant, and so forth, and then recovered by various methods such as decantation. Specifically, during emulsion polymerization, the PTFE is polymerized using a wetting agent in order to avoid the formation of large, granular PTFE crystalline particles.

End uses for such commercially available fine powder PTFE products in industrial applications have typically included the formation of PTFE tape, PTFE tubing, and sintered PTFE sheets or tape. Typically, fine powder PTFE products undergo a process commonly termed in the art as "paste extrusion," whereby the PTFE is placed into a carrier and is extruded to form such tapes, tubing, and sheets. It is believed that the ability of fine powder PTFE products to undergo paste extrusion successfully stems from the elongation ratio of the PTFE particles. As the PTFE industry has evolved, however, irregularities in such tapes and sheets have been observed, leading those skilled in the art to become concerned about reducing the particle size of the PTFE particles in such fine powder PTFE products. Also, such commercially available fine powder PTFE products have been known to exhibit significant stickiness and fibrillation.

Various examples of PTFE powders exist in the art. For example, ICI Fluoropolymers produces a commercially available product known as FLUOROGLIDE FL 1700, which acts as a lubricant and is described in product literature as a white, finely divided, coarse, low molecular weight PTFE powder that is intended for processing via high shear mixing to achieve submicron particle size. Information known in the art about FLUOROGLIDE FL 1700 indicates that the material is used primarily as an additive to improve wear resistance and enhance lubricity, non-stick and frictional characteristics of a host medium.

Additionally, a PTFE fine powder product manufactured by DuPont is known in the art and commercially available as ZONYL Fluoroadditive MP 1100. This product is described as a white, free-flowing PTFE powder designed for use as an additive in other materials, for example, as a process aid, a grease additive, an oil additive, or a thickener for an oil or grease, in order to impart low surface energy and other fluoropolymer attributes to the given system. The DuPont ZONYL MP 1100 product may also be used alone as a dry lubricant.

The desire of fluoropolymer manufacturers to create improved processes for making submicron PTFE powders and submicron PTFE dispersions stems from the wide array of end uses that exists for small particle size or submicron PTFE. For example, small amounts (e.g., about 0.1 to 2% by weight) of powdered PTFE may be incorporated into a variety of compositions to provide the following favorable and beneficial characteristics: (i) in inks, PTFE provides excellent mar and rub resistance characteristics; (ii) in cosmetics, PTFE provides a silky feel; (iii) in sunscreens, PTFE provides increased shielding from UV rays or increased SPF (sun protection factor); (iv) in greases and oils, PTFE provides superior lubrication; and (v) in coatings and thermoplastics, PTFE provides improved abrasion resistance, chemical resistance, weather resistance, water resistance, and film hardness.

Other, more specific end uses for submicron PTFE powders and dispersions include, but are certainly not limited to: (i) incorporating a uniform dispersion of submicron PTFE particles into electroless nickel coatings to improve the friction and wear characteristics of such coatings (Hadley et al., *Metal Finishing*, 85:51–53 (December 1987)); (ii) incorporating submicron PTFE particles into a surface finish layer for an electrical connector contact, wherein the PTFE particles provide wear resistance to the surface finish layer (U.S. Pat. No. 6,274,254 to Abys et al.); (iii) using submicron PTFE particles in a film-forming binder as a solid lubricant in an interfacial layer, wherein the interfacial layer is part of an optical waveguide fiber (U.S. Pat. No. 5,181,268 to Chien); (iv) using a submicron PTFE powder (along with a granulated PTFE powder and $TiO_2$) in a dry engine oil additive, wherein the additive increases the slip characteristics of the load bearing surfaces (U.S. Pat. No. 4,888,122 to McCready); and (v) combining submicron PTFE particles with autocatalytically-applied nickel/phosphorus for use in a surface treatment system for metals and metal alloys, wherein the PTFE imparts lubrication, low friction, and wear resistance to the resulting surface ("Niflor Engineered Composite Coatings," Hay N., International, Ltd. (1989)). Additional specific examples of end uses for PTFE involve incorporating PTFE into engine oils, using PTFE as a thickener in greases, and using PTFE as an industrial lubricant additive. Willson, *Industrial Lubrication and Tribology*, 44:3–5 (March/April 1992).

Furthermore, the use of PTFE powders as additives to the polymers used to make certain fibers is important in that the PTFE powder improves the non-wetting properties of the fibers and the textiles made from such fibers. Thus, fibers incorporating PTFE powder additives are useful in industrial textiles such as textile articles used for filtration and dewatering processes. Such fibers incorporating PTFE powder additives may also be used in producing carpets, fabrics for sportswear and outerwear, hot-air balloons, car and plane seats, umbrellas, and the like. The incorporation of PTFE into such textiles results in many advantages, such as the textile articles being easier to clean. Furthermore, the incorporation of PTFE into certain fibers may provide those fibers with improved tensile strength.

It is important to note, however, that those skilled in the art related to PTFE powders and PTFE dispersions have experienced difficulties in knowing how to obtain colloidal PTFE that is properly stabilized and dispersed in media such as mineral oils, other synthetic oils, resins, polymers, and so forth. It has been realized in the industry that a truly stable colloidal suspension of PTFE particles requires the particles to be of submicron size and to have suitable surface chemistry. Thus, novel methods of forming stable colloidal suspensions or dispersions of submicron PTFE particles are important and desired in the industry.

For many applications or end uses incorporating submicron PTFE powders and submicron PTFE dispersions (such as the end uses described above), the beneficial effects being imparted to the application or end use system are derived from the chemical inertness of the PTFE particles and/or the low coefficient of friction of the PTFE particles. In addition, because submicron PTFE particles have such low particle size, they possess a significantly higher ratio of surface area to weight when compared to larger PTFE particles. Thus, submicron PTFE particles (as compared to larger PTFE particles) are better able to supply their useful effects to a desired application system when incorporated at the same weight load. Therefore, novel methods for preparing submicron PTFE powders and submicron PTFE dispersions would be advantageous to many end uses, products, and/or compositions.

In short, a need exists for simple and straightforward methods for preparing submicron PTFE powder that is free-flowing, that is readily dispersible in various application systems, and that tends not to self-agglomerate (so that neither costly chemical additives nor a substantial amount of energy is required to disperse the submicron PTFE powder into a desired application system). In addition, a need exists for improved methods of forming both aqueous and organic dispersions of submicron PTFE particles, wherein such dispersions are more stable, have less tendency to coagulate over time, and are less physically sensitive to temperature changes and physical agitation. The disclosure of the present invention addresses these and other needs.

SUMMARY OF THE INVENTION

The present invention generally relates to methods for producing submicron PTFE powder and improved methods for producing submicron PTFE dispersions. In addition, the present invention relates to the submicron PTFE powder products formed according to the present methods, wherein the submicron PTFE powder formed is free-flowing, tends not to self-agglomerate, is readily dispersible when placed in a desired application system, and tends not to dust into the air upon handling.

As used herein, the common chemical shorthand term "PTFE" is used to denote polytetrafluoroethylene. However, for simplicity, the general term "PTFE" is also used herein to describe copolymers wherein the bulk of the copolymer material is polytetrafluoroethylene. For example, the term "PTFE" is used herein to denote polytetrafluoroethylene that is copolymerized with (or further comprises) the following polymers: fluorinated ethylene-propylene copolymer ("FEP"); perfluoroalkoxy resin ("PFA"), which is a copolymer of tetrafluoroethylene and perfluorovinylethers; ethylene-tetrafluoroethylene copolymer ("ETFE"); polychlorotrifluoroethylene ("PCTFE"); "ECTFE," which is the copolymer of ethylene and chlorotrifluoroethylene; polyvinylidene fluoride ("PVDF"); and polyvinyl fluoride ("PVF"). Where the term "PTFE" is used herein to describe polytetrafluoroethylene that is copolymerized with one of the above-named polymers, it is contemplated that the actual polytetrafluoroethylene content in the copolymer is about 70% by weight or higher.

In addition, with respect to the terminology used herein, the phrase "PTFE starting material" is used to denote any commercially available PTFE product that comprises loose agglomerates of PTFE particles, wherein the PTFE particles have a primary particle size of less than 1.0 $\mu$m and more particularly, a primary particle size of from about 0.1 to 0.5 μm. The term "PTFE starting material" is further limited herein to commercially available PTFE products that are known as one of the following: (i) a "fine powder" PTFE starting material; (ii) a "coagulated dispersion" of PTFE particles; and (iii) a PTFE powder made from "emulsion polymerization" or "dispersion polymerization." Specifically, the definition of "PTFE starting material" is limited herein to such fine powder PTFE products, PTFE in the form of a coagulated dispersion, and PTFE formed from emulsion polymerization because, not wishing to be bound by theory, it is believed that such fine powder PTFE products, PTFE coagulated dispersions, and PTFE products formed from emulsion polymerization have the lowest primary particle size of commercially available PTFE products. For further clarification, the term "PTFE starting material" as used in the description of the present invention is not meant to include granular PTFE starting material (which is formed by suspension polymerization).

Furthermore, with respect to the terminology used herein, the phrase "submicron PTFE powder" denotes the general PTFE powder end-product resulting from the methods of the present invention, wherein the dry PTFE powder particles (following removal of the solvent) are actually larger than submicron size, but wherein the PTFE particles subsequently become submicron-sized when the dry PTFE powder is dispersed into a chosen application system. Likewise, the phrases "dry PTFE powder" and "dry PTFE powder particles" are used in this application to denote the recovered, dry PTFE powder and/or the recovered, dried, and powdered PTFE before it has been readily dispersed into a desired application system.

Generally, the methods described by the present invention show improvements over known processes for creating submicron PTFE because the submicron PTFE powder formed according to the present invention is a powder from which the initial solvent has been removed so that the resulting dry PTFE powder may be placed into any desired system by the user. In many prior art methods of preparing submicron PTFE particles, the particles typically must be used in their liquid or dispersed form, which incorporates the initial solvent used to prepare the original PTFE dispersion. Thus, the method of the present invention presents a highly desirable method by which submicron PTFE powder may be recovered from a PTFE solvent concentrate and subsequently dispersed into the user's chosen application system.

In addition, the method of the present invention differs from known methods of producing submicron PTFE particles in that the present method does not require the addition of surfactants, wetting agents, rheology agents, or pH-adjusting agents. However, the afore-mentioned agents (and other agents) may be added if desired or needed in the particular application system chosen by the user.

In one preferred method of the present invention, a fine powder PTFE starting material is first irradiated from about 5 to about 120 megarads, preferably from about 10 to about 100 megarads, and most preferably from about 20 to about 90 megarads. This first step involving irradiating the PTFE starting material has been the subject of patents and literature known in the art. For example, an early description of the irradiation of PTFE is contained in U.S. Pat. No. 3,766,031 to Dillon (the specification of which is hereby incorporated by reference herein in its entirety), which describes how PTFE may be placed in trays and subjected to irradiation.

Furthermore, U.S. Pat. Nos. 4,748,005 and 4,777,192 to Neuberg et al., owned by the assignee of the present invention, disclose commercial batch processing of PTFE, wherein PTFE material is placed in a ribbon blender and electron beam irradiation is directed into a portion of the blender while the PTFE material is being agitated by the blender. The specifications of U.S. Pat. Nos. 4,748,005 and 4,777,192 are hereby incorporated by reference herein in their entirety. Other U.S. patents disclosing methods of irradiating PTFE particles and apparatuses used for the irradiation of PTFE particles include U.S. Pat. Nos. 5,149,727 and 5,296,113 to Luniewski and U.S. Pat. No. 5,968,997 to Luniewski et al., the specifications of which are hereby incorporated by reference herein in their entirety.

Following the step of irradiation, the irradiated PTFE starting material may be used directly in the next step of the process, or the irradiated PTFE may be baked first in order to remove hydrogen fluoride (HF) and other by-product molecules from the composition.

The irradiated PTFE is subsequently added directly to a chosen solvent or solvents. Solvents that may be used in this method of the present invention include, but are not limited to: alcohols such as methanol, ethanol, isopropyl alcohol ("IPA"), butanol, amyl alcohol, and the like; ketones such as acetone and methyl ethyl ketone; glycols such as ethylene glycol and propylene glycol; hydrocarbons such as hexane, octane, decane, and mineral spirits; aromatics such as toluene and benzene; butyl carbitol (diethylene glycol monobutyl ether); water; and various other common solvents.

Solvents useful for this method of the present invention (including those mentioned above and others) should possess some ability to wet the PTFE particles for the grinding step (discussed in detail below), yet should also allow the PTFE particles to be readily separated from the solvent following the grinding step. General techniques used for separating out the PTFE particles after grinding include, but are not limited to, filtration, centrifugation, critical gas extraction, evaporation, and co-mingling with other fluids so that the PTFE separates or flocculates and may be filtered, scooped, or centrifuged for removal. These and other separation techniques are described in more detail below.

An important element of this method of making submicron PTFE powder according to the present invention is that the irradiated PTFE starting material may be added directly to the chosen solvent without the addition of any surfactant, wetting agent, rheology agent or modifier, or pH-adjusting agent. As discussed earlier, traditional processes known in the art for producing submicron PTFE powders typically require the addition of such agents.

After the irradiated PTFE starting material is added directly to a chosen solvent or solvents (forming what is termed herein as a "solvent concentrate" of PTFE particles), the solvent concentrate subsequently undergoes a grinding step, and this grinding is continued until the PTFE particles reach submicron size. As used herein, the term "grinding" denotes three distinct procedures by which the particle size of the PTFE particles is reduced. Specifically, "grinding," as used herein, denotes: (i) actually breaking apart the solid crystalline PTFE particles themselves and thereby reducing the particle size to submicron size; (ii) de-agglomerating the larger agglomerates of PTFE, whereby the goal of the "grinding" is to maintain the PTFE particles in their primary particle size and recover the PTFE particles in their primary particle size, the primary particle size being less than about 1.00 $\mu$m; and (iii) a combination of both actually breaking apart the PTFE particles themselves and de-agglomerating the larger PTFE agglomerates into smaller PTFE particles. This explanation is given because, not wishing to be bound by theory, it is not definitively known whether the particle size reduction that takes place during preferred methods of the present invention is attributed to actually breaking apart the PTFE particles, simply de-agglomerating the larger PTFE agglomerates into PTFE particles of their "primary particle size," or a combination of both.

The grinding step typically takes place in a sand mill, a basket mill, a horizontal media mill, or other such apparatus. The mixture is ground and recycled until the proper particle size distribution is reached and a determination is made that most of the PTFE particles are of submicron size.

At this point in the present method, the resulting submicron PTFE concentrate unexpectedly possesses the characteristics of the submicron PTFE particles being easily recoverable and in a readily-usable state after drying. Thus, although particle size analysis of the submicron PTFE particles in a solvent concentrate typically indicates an average particle size of about 0.25 to about 0.4 $\mu$m, the submicron PTFE particles themselves may be recovered readily through filtration, centrifugation, evaporation, aeration followed by flotation, critical gas extraction, and/or co-mingling the PTFE solvent concentrate with water for recovery.

In certain embodiments, to obtain submicron PTFE powder, the solvent concentrate of submicron PTFE particles may be filtered using ordinary filter paper, whereby the submicron PTFE particles are captured by the filter paper. Alternatively, the solvent concentrate of submicron PTFE particles may be centrifuged in order to separate out the submicron PTFE particles from the solvent. Following either the filtration or the centrifugation, the resulting PTFE/solvent cake may be dried (typically in an oven) or may first be mixed with water in order to remove the solvent. In embodiments where the PTFE/solvent cake is first mixed with water to remove the solvent, the mixture is again filtered, centrifuged, decanted, or the like, and then dried.

After drying, the resulting dry PTFE material may be powdered with an air mill, a chopper, a mechanical mill, or a similar device in order to yield a soft, free-flowing PTFE powder material with an average agglomerate particle size of about 5 $\mu$m to about 75 $\mu$m. (The actual size of the PTFE powder particle agglomerates depends on the intensity of the powdering, the number of passes, and the time allowed for powdering.) Maintaining the particle size of the dry PTFE powder particles in the range of from about 5 $\mu$m to about 75 $\mu$m yields a soft free-flowing PTFE powder that does not readily "dust" into the air with handling.

Unexpectedly, the dry PTFE agglomerate powder formed according to the above-described method is readily dispersible into many desired application systems, requiring only a low level of mixing or agitation of the powdered agglomerate. This dispersion of the dry PTFE agglomerate powder into, for example, a solvent, a resin, a coating, or another desired liquid application system allows the dry PTFE powder agglomerates to disperse back into submicron-sized PTFE particles.

Furthermore, the submicron PTFE powder resulting from this method is free-flowing and has little to no tendency to form self-agglomerating products that will not disperse into a desired application system. These results (specifically, the extremely low tendency of the resulting submicron PTFE powder to self-agglomerate) are quite unexpected, since one skilled in the art would predict an increase in the probability of the PTFE particles to self-agglomerate because of the significant increase in the exposed surface area of the particles as a result of the very small (submicron) particle size of the PTFE particles.

Under certain conditions, such as high composition pressures, high temperatures, or excessive vibration, a substantial amount of agglomeration may occur despite the improved properties imparted to the submicron PTFE powder formed according to the present invention. In such situations, well-known anti-caking agents, such as diatomaceous earth, starch, amorphous silica, and the like, may be mixed with the submicron PTFE powder at use levels of from about 1% to about 25% by weight.

In alternative embodiments of the present invention, the solvent concentrate itself, which comprises the dispersed PTFE particles without any other additives, may be useful, after grinding, and may provide benefits or advantages to various applications. For example, a solvent concentrate, wherein irradiated PTFE particles are added directly to IPA without the addition of any surfactant, wetting agent, rheology agent, or pH-adjusting agent, may be used directly as a mold release agent, or the solvent concentrate of irradiated PTFE particles may be mixed with a grease carrier, after which the IPA is removed by vacuum and/or heat in order to form a PTFE-based grease. A solvent concentrate of irradiated PTFE particles may also be used directly as a spray or aerosol or as a dry film lubricant for applications such as metal forming, drawing, rolling, and the like.

In a similar fashion, the irradiated PTFE may be added to a resin or non-solvent carrier and subsequently ground, whereby the resulting submicron PTFE concentrate may be used in a desired application system. For example, irradiated PTFE may be added to D.E.R. 331 epoxy resin (manufactured by Dow Chemical) and ground, whereby the concentrate is useful for can coatings. In addition, irradiated PTFE may be added to Carboset 515 acrylic resin (manufactured by NOVEON) and ground, whereby the concentrate is useful for adhesives. Similarly, irradiated PTFE may be added to M-8020 hydroxylated polyester (manufactured by Reichhold) and ground, whereby the concentrate is useful for appliance coatings.

Furthermore, the methods of the present invention may also be useful for incorporating submicron PTFE particles into inks, wherein an ink resin (along with any desired additives) constitutes the application system. For example, about 25% to about 70% by weight of the submicron PTFE powder formed according to the above-described method may be dispersed in a dispersion vehicle such as Algan's al-gloss H083 (a modified phenolic hydrocarbon resin) and subsequently let down and used with other additives and/or resins to form a heat set ink. For incorporating the submicron PTFE powder into a sheet feed ink, about 25% to about 70% by weight of the submicron PTFE powder may be dispersed into ADM's "Superb" (an alkali-refined linseed oil) and subsequently let down to form the sheet feed ink. In applications such as these, the submicron PTFE powder may be added directly to an ink resin, followed by the addition of any desired additives. Also, any desired additives may be added first to the chosen ink resin, followed by the addition of the submicron PTFE powder.

In addition, for use in fiber optic coatings, the submicron PTFE powder formed according to the present method may be incorporated into tri-propylene glycol di-acylate as the desired application system. Furthermore, for use in coatings for automotive parts (such as headlights, tail lights, and the like), the submicron PTFE powder formed according to the present method may be dispersed into a resin/monomer combination, wherein the resin is, for example, ethoxylate tri-methyl propane tri-acylate and the monomer is, for example, ethoxylate 1,6 hexane diol-acylate.

In other embodiments of the present invention, irradiated PTFE may be mixed into resins, polymers, monomers, waxes, and the like, and subsequently agitated with high intensity in a device such as a single screw melt extruder, a twin screw melt extruder, a multi-screw melt extruder, a Banburry mixer or blender, or a dispersion mixer until the PTFE particles are dispersed into the medium and are reduced to submicron particle size. For example, irradiated PTFE may be mixed with pellets of polyethylene (PE) and subsequently fed into a twin screw melt extruder for single or multiple passes until the particle size of the PTFE particles is below 1.00 $\mu$m. In such embodiments, the intensity of the irradiation of the PTFE is typically from about 1 to about 50 megarads, preferably from about 5 to about 40 megarads, and more preferably, from about 15 to about 35 megarads.

Not wishing to be bound by theory, it is believed that the high shearing forces, extensional or elongation forces, and particle-to-particle attrition provide the mechanism for particle size reduction in embodiments like the ones described in the above paragraph involving a melt extruder or a like device designed to handle viscous fluids. Thus, for example, 30% by weight irradiated PTFE may be placed into PE and subsequently agitated in a high-intensity device in order to reduce the particle size of the PTFE particles to submicron size. This results in a concentrate or "master batch" that may be "let down" via extrusion into a batch of PE in order to supply a final polymer comprising about 0.1% to about 7.5% by weight submicron PTFE particles.

In addition to the embodiments described above, the present invention also encompasses methods by which improved dispersions of submicron PTFE particles are formed in various application systems. In such embodiments of the present invention, stable dispersions of submicron PTFE particles are formed by first irradiating the chosen PTFE starting material and then adding the irradiated PTFE material directly to the desired application system, wherein the PTFE particles disperse to submicron size with mild agitation. These improved dispersions of submicron PTFE particles may be formed without the addition of surfactants, wetting agents, rheology agents or modifiers, and pH-adjusting agents. However, when needed or convenient, it is acceptable for such agents to be incorporated into the stable submicron PTFE dispersions formed according to these embodiments.

Not wishing to be bound by theory, it is believed that the step of irradiating the PTFE starting material (a fine powder PTFE product, a coagulated solids PTFE product, or a solid PTFE product formed via emulsion polymerization) alters the consistency of the primary PTFE particles so that the PTFE particles are more readily dispersible and do not exhibit their typical tendencies to display stickiness and fibrillation. Therefore, it is believed that in the presently-described embodiments of the present invention, irradiating the PTFE starting material causes the primary PTFE particles to be released or dispersed from their agglomerate state when the irradiated PTFE material is placed into the desired application system with mild agitation.

Experiments carried out for the present invention indicate that an inverse relationship exists between the amount of irradiation to which the PTFE starting material is subjected and the intensity of agitation needed to achieve a submicron dispersion of PTFE particles. Thus, as will be further described below, embodiments of the present invention wherein the PTFE starting material is subjected to a level of irradiation of about 28 megarads further entail the grinding of the solvent concentrate of irradiated PTFE particles as well as a considerable amount of time and agitation, whereas embodiments of the present invention wherein the PTFE starting material is subjected to a level of irradiation of about 72 megarads show that the same degree of dispersion of the PTFE particles to submicron size may be achieved in less time and with less agitation, even to a point where the irradiated PTFE starting material may be directly dispersed into a desired application system.

In addition, it is well known that commercially available PTFE materials, such as PTFE fine powder products or PTFE solids recovered from emulsion polymerization, tend to fibrillate, or readily form fibrils, chains, or fibers upon shearing. However, in certain embodiments of the present invention where PTFE starting material is subjected to about 28 megarads of irradiation and a lengthy shearing or grinding process in a solvent, a resin, or the like, the resulting submicron PTFE product exhibits no fibrillation. Thus, an inverse relationship exists between the intensity of irradiation to which a PTFE starting material is subjected and the degree of fibrillation exhibited by the PTFE particles. Thus, a series of experiments at amounts of irradiation ranging from 0 megarads to about 28 megarads would yield the precise mathematical relationship between the intensity of irradiation and the degree of fibrillation exhibited by a sample of PTFE starting material.

In short, in certain embodiments of the present invention, it is clear that upon selecting the correct PTFE starting material, it is possible to form a submicron PTFE powder that possesses the same basic properties as the submicron PTFE powder formed in other embodiments of the present invention (specifically, those embodiments wherein the method involves placing the irradiated PTFE particles into a solvent, grinding, and recovering using, for example, filtration), but where the grinding or de-agglomeration step has been eliminated.

The improved submicron PTFE dispersions formed according to the above-described embodiments may also be used in all of the application systems described in detail above for the submicron PTFE powder.

The present invention is further described below with respect to the specific embodiments disclosed herein.

BRIEF DESCRIPTION OF THE DRAWINGS

Further objects and advantages of the present invention will be more fully appreciated from a reading of the detailed description when considered with the accompanying drawings, wherein.

DETAILED DESCRIPTION OF THE INVENTION

Figure 1:
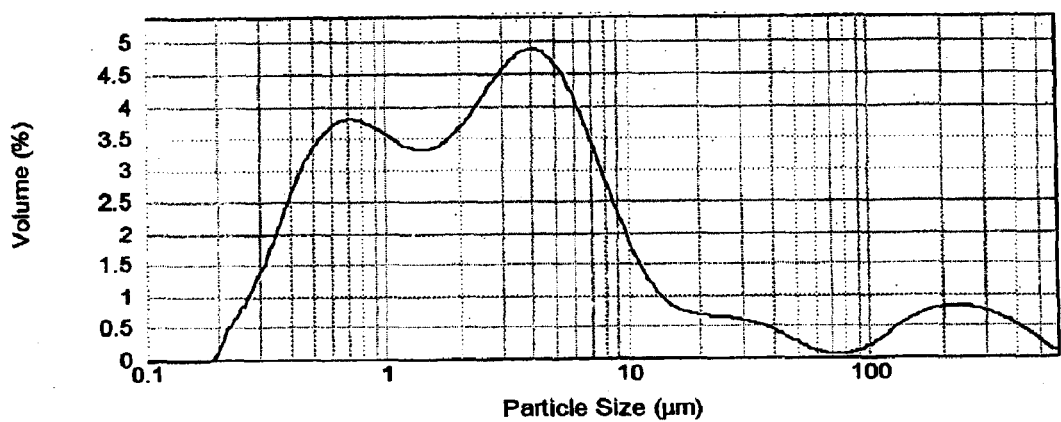
FIG. 1 shows a particle size distribution graph for a sample of dry PTFE powder formed according to the present method.

The present invention discloses a method for producing a submicron PTFE powder and the product thereof. More particularly, the submicron PTFE powder formed according to the method described herein is free-flowing, has little tendency to dust into the air upon handling, and has little to no tendency to self-agglomerate when placed in a desired application system or medium.

In certain preferred embodiments of the present invention, a PTFE starting material is first selected. As discussed earlier, the phrase "PTFE starting material" is used to denote a fine powder PTFE product (such as a fine PTFE powder having a primary particle size of about 0.1 $\mu$m), a coagulated dispersion of PTFE particles, or a PTFE powder made from an emulsion polymerization process. The term "PTFE starting material" as used in the description of the present invention is not meant to include granular PTFE material, which is formed by suspension polymerization.

Examples of PTFE starting material that may be employed in the present invention include Daikin F103, F301, and F104 fine powder PTFE products and the like. Other examples of commercially available PTFE starting materials appropriate for use in the present invention may include, but are not limited to, those found in Table 1 below.

TABLE 1

| Reduction Ratio | DuPont Teflon ® | Imperial Chemical Industries Fluon ® | Dyneon Hostaflon ® | Daikin Polyflon ® | Ausimont Algoflon ® |
|---|---|---|---|---|---|
| <100 | 603J, 604J, 601A, 602A, 613A | CD-147 | TF-2029 | F-103 | DF 200 |
| <300 | 637N, 669N, 65N | CD-141, CD-126 | TF 2021, TF 2027 | F-301 | DF 210, DF 280X |
| <800 | 60A, 67A | CD-123 | TF-2025, TF-2026 | F-104 | DF 1 |
| <1,600 | 6C, 62, 636N, 600A | CD-086, CD 1, CD 014 | TFM-2001, TF-2053, TF-2071 | F-302, F303 | DF 380, DF 381X |
| <3,000 | 6C, 640J | CD 509 | | | |
| <4,400 | 6C, 610A, CFP-6000, 614A, 60A, 600A | CD-076, CD-090, CD 506 | TF-2072 | F-201, F203 | DFC |

The examples of commercially available PTFE starting materials listed in Table 1 above include PTFE products that are categorized as "fine powder" PTFE products and are grouped according to their respective reduction ratios. Many additional examples of commercially available PTFE starting material that are appropriate for use in the present invention are found in Ebnesajjad, *Fluoroplastics Volume 1: Non-Melt Processible Fluoroplastics, The Definitive User's Guide and Databook*, Plastics Design Library (2000), which is incorporated by reference herein in its entirety.

As explained in detail above, the term "PTFE" is used herein to denote polytetrafluoroethylene as well as copolymers, wherein the bulk of the copolymer material is polytetrafluoroethylene, and more particularly, copolymers wherein about 70% by weight or more of the copolymer content is polytetrafluoroethylene.

In one preferred embodiment of the present invention for forming a submicron PTFE powder, the chosen PTFE starting material is first irradiated from about 20 to about 40 megarads. Following the irradiation of the PTFE starting material, a desired amount of the irradiated PTFE is added directly to a chosen solvent or solvents. For example, in certain preferred embodiments, up to about 40% by weight of the irradiated PTFE starting material is added to a solvent such as IPA, acetone, butyl carbitol, or the like. Typically, the concentration of the irradiated PTFE in the chosen solvent or solvents is from about 5% by weight to about 45% by weight. In certain preferred embodiments, the concentration of the irradiated PTFE in a solvent comprising IPA may be about 25% by weight.

This addition of the irradiated PTFE to the solvent or solvents of choice takes place without the addition of any surfactant, wetting agent, rheology modifier or agent, or pH-adjusting agent in the embodiments wherein a dry submicron PTFE powder is sought. However, the use of such agents may be appropriate in the embodiments discussed herein where a dispersion of PTFE particles is being formed and where the desired application system requires the use of such an agent.

In the embodiments of the present invention where a dry submicron PTFE powder is sought, the addition of the irradiated PTFE to the chosen solvent or solvents is carried out gently while mixing the PTFE/solvent mixture. This mixing of the "pre-dispersion" of the PTFE particles should continue until the first pass of grinding has been completed in order to prevent the PTFE particles from settling.

After the irradiated PTFE is added to the solvent or solvent of choice, this "pre-dispersion" of the PTFE particles is ground until the PTFE particles are submicron size. In preferred embodiments, the grinding may be carried out using a sand mill, a basket mill, a horizontal media mill, or the like. In certain preferred embodiments, a horizontal media mill is used to grind the PTFE particles to submicron size (or, as discussed before, de-agglomerate the PTFE agglomerates to PTFE particles in their primary particle size), wherein the horizontal media mill performs at a rate of about 3500 RPM and uses beads having diameters of from about 0.6 mm to about 0.8 mm.

The particle size of the PTFE particles may be checked after each pass of grinding has been completed or after a series of passes (for example, a series of 5 passes) of grinding has been completed using an apparatus such as a horizontal media mill. In preferred embodiments of the present invention, the particle size of the PTFE particles in the "pre-dispersion" (comprising the irradiated PTFE and the chosen solvent or solvents) will reach submicron-size after about 7 to about 10 passes of grinding.

The resulting solvent concentrate of submicron PTFE particles may be processed directly or may be filtered using ordinary filter paper, wherein the filter paper captures the submicron particles. Rather than filtering the solvent concentrate, the concentrate of submicron PTFE particles may be centrifuged in order to separate the submicron PTFE particles from the solvent. Furthermore, in embodiments where IPA is the chosen solvent, the solvent concentrate of submicron PTFE particles may be co-mingled with water so that the PTFE separates or flocculates and may be filtered, scooped, or centrifuged for removal. (As noted earlier, critical gas extraction, evaporation, and aeration followed by flotation are additional methods for the recovery of the submicron PTFE particles from the solvent concentrate of submicron PTFE particles.)

Following the desired recovery method (such as filtration or centrifugation), the resulting PTFE/solvent cake may be dried in an oven or may be mixed with water in order to remove the solvent. In cases where the PTFE/solvent cake is mixed in water to remove the solvent, the mixture is again filtered and is subsequently dried.

In certain embodiments of the present invention, hot tap water is added to a desired amount of the solvent concentrate of submicron PTFE particles while mixing using a high-speed mixer. This is done in order to remove the solvent from the submicron PTFE particles. In such embodiments, the mixture of water and the solvent concentrate of PTFE particles is typically mixed for about 10 minutes, and it is subsequently allowed to stand for about 10 minutes. The sample is then filtered using ordinary filter paper and is dried in an oven at a temperature of about 60° C.

In the method of the present invention, the resulting sample of dry submicron PTFE powder should have a fluffy consistency and should only require minimal shaking, for example, in a plastic bag, in order to break down the particles. Alternatively, the resulting dry PTFE powder sample may be passed through an apparatus commonly used to powder material in order to break down the agglomerates. For example, the dry PTFE powder sample may be passed through an air mill for one pass in order to break down the agglomerates. The resulting product formed according to the above method should be submicron PTFE powder.

The submicron PTFE powder formed according to the present method has the desired characteristics of being free-flowing and tending not to self-agglomerate. Thus, the resulting submicron PTFE powder has many advantages such as increased ability to disperse in a chosen application system or target medium. The increased ability to disperse in a chosen application system better enables the submicron PTFE powder formed according to the present method to impart desired characteristics to that system.

In alternative preferred embodiments of the present invention, a method is disclosed for producing improved, stabilized PTFE dispersions, wherein the PTFE particles in such dispersions are dispersed to submicron size. In these embodiments, a PTFE starting material is first selected from the group consisting of fine powder PTFE products, coagulated PTFE solids products, and PTFE powder products formed via emulsion polymerization. After the appropriate PTFE starting material is selected, the chosen PTFE starting material is irradiated at an intensity of from about 5 megarads to about 120 megarads, preferably from about 10 to about 100 megarads, and more preferably from about 20 to about 90 megarads. Following the step of irradiation, the irradiated PTFE starting material optionally may be baked in order to remove HF byproduct molecules and other low molecular weight species from the system.

The irradiated PTFE powder may then be broken down by using an air mill, a chopping apparatus, a hammer mill, or the like, so that the PTFE powder particles have an average particle size of from about 5 $\mu$m to about 75 $\mu$m. The resulting non-dusting, non-agglomerating dry PTFE powder is then readily dispersible into a chosen application system, wherein the PTFE particles disperse to submicron in size. Specifically, the dry PTFE powder resulting from the instant embodiment may be dispersed into an application system with or without the use of additives such as surfactants, wetting agents, rheology agents or modifiers, and pH-adjusting agents.

In the methods of the present invention, an important step involves the determination of the particle size of the resulting PTFE powder particles in order to confirm that they are submicron in size. Specifically, the terms "submicron" and "submicron in size" are used herein to describe particle size analysis results for samples of the PTFE powder and the stabilized PTFE dispersions resulting from the present method, wherein 50% or more by numerical count of the PTFE particles in the particle size test medium are less than 1.00 $\mu$m in size, more preferably, wherein 75% or more by numerical count of the PTFE particles in the particle size test medium are less than 1.00 $\mu$m in size, and most preferably, wherein 90% or more by numerical count of the PTFE particles in the particle size test medium are less than 1.00 $\mu$m in size.

In certain preferred embodiments of the present invention, the particle size analysis of the resulting submicron PTFE powder particles is carried out using a Malvern Mastersizer 2000 Particle Size Analyzer, which is a laser scattering particle size distribution analyzer, commercially available from Malvern Instruments Ltd. in Malvern, UK. Several distinct procedures are used for particle size analysis of the PTFE particles, depending on whether the sample of the resulting submicron PTFE powder to be analyzed is in dry form or has been dispersed into a particular liquid dispersant.

When samples of the dry submicron PTFE powder formed according to the present method are analyzed, a dry powder standard operating procedure may be set up. For example, in certain preferred embodiments, the dry powder PTFE QSOP ("Quality Standard Operating Procedure") that is stored in the Malvern Mastersizer may be selected in order to perform the particle size analysis of the dry PTFE powder particles. This QSOP is outlined in Table 2 below:

TABLE 2

QSOP for Particle Size Analysis of Dry Submicron PTFE Powder

| Criteria | Setting | Value |
|---|---|---|
| Sample Selection | Scirocco 2000(A) | |
| Material | PTFE | |
| | Refractive Index | 1.38 |
| | Absorption | 0.1 |
| Labels | Factory Settings | |
| Reports & Saving | Factory Settings | |
| Measurement | Measurement Time | 12 seconds |
| | Measurement Snaps | 12,000 |
| Background | Background Time | 12 seconds |
| | Background Snaps | 12,000 |
| Sample Settings | Sample Tray | General Purpose (<200 g) |
| | Dispersive Air Pressure | 4 Bar |
| | Aliquots | Single |
| | Feed Rate | 79% |
| | Measurement Cycle | Single |

Specifically, the Mastersizer employs a Scirocco 2000 dry accessory when samples of dry submicron PTFE powder are being studied. In preferred embodiments, the lid of the Scirocco 2000 is opened, approximately 2 grams of the dry submicron PTFE powder sample are added to the sample tray, and the lid is closed. The Mastersizer 2000 software program may then be opened by selecting the appropriate icon. The desired SOP is selected (here, the QSOP for dry submicron PTFE powder), and the sample information is then entered. The particle size analysis is then begun by pressing start.

In preferred embodiments, the dry powder PTFE particle size analysis is repeated approximately 5 times, with the overall recording time being about 1 minute, in order to average out small deviations in the particle size measurements obtained. An example of a particle size distribution graph showing the particle size analysis results from the Malvern Mastersizer for a sample of the dry submicron PTFE powder formed according to the present method is included as FIG. 1. This Figure shows results for a sample of the dry PTFE powder (before it is dispersed into an application system where it subsequently becomes submicron-sized); thus, the fact that the vast majority of the PTFE particles are below 10 $\mu$m in size is an expected result. Furthermore, FIG. 1 shows that 26.68% of the PTFE particles in the sample of dry PTFE powder are below 1.00 $\mu$m in size, suggesting that once this sample of dry PTFE powder (formed according to the present method) is placed in a desired application system, 100% of the PTFE particles will disperse and become submicron in size.

When the dry PTFE powder formed according to the present invention is dispersed in a particular liquid application system or dispersant (and therefore is in a liquid phase rather than its dry powder phase), distinct procedures for measuring the particle size of the PTFE particles are used, depending on what liquid is chosen as the dispersant for the dry PTFE powder. The Malvern Mastersizer 2000 is still used for particle size analysis of the liquid dispersals of the PTFE powder; however the Hydro 2000S is used rather than the Scirocco 2000 dry accessory. Furthermore, during all particle size analyses with the Malvern Mastersizer for samples wherein the submicron PTFE powder has been dispersed into a liquid application system, a carrier solution is required.

In embodiments where IPA is selected as the "dispersant" (or the liquid medium into which the submicron PTFE powder is dispersed for particle size analysis), approximately 2 grams of the dry PTFE powder may be placed into a plastic 20 mL-capacity cuvette, and the cuvette may be filled with IPA up to the 20 mL mark. Thus, IPA serves as the carrier solution. Optionally, about 0.2 grams of STGE surfactant may be added to the IPA carrier solution. "STGE" stands for Surfynol TG-E Surfactant, which is a nonionic surfactant, manufactured by Air Products and Chemical, Inc., which aids in rapidly dispersing and in maintaining the dispersion of the submicron PTFE as it is incorporated into the chosen carrier solution.

The cuvette is then capped securely and is shaken for about 30 seconds in order to disperse the sample of the submicron PTFE powder into the IPA. Subsequently, the cuvette is opened, and the sample is sonicated for about 1 minute. In other embodiments, about 2% by weight of the dry PTFE powder is added to a given volume of IPA, and the PTFE powder is mixed with the IPA using a blender or a high-speed disperser for about 3–5 minutes.

The Mastersizer 2000 software program may then be opened by selecting the appropriate icon. The desired SOP is set up (here, the SOP for submicron PTFE powder dispersed in IPA), and the sample information is then entered. The SOP for the Malvern Mastersizer that is used in measuring the particle size of submicron PTFE powder particles dispersed in IPA is outlined in Table 3 below.

TABLE 3

SOP for Particle Size Analysis: Submicron PTFE Powder Dispersed in IPA

| Criteria | Setting | Value |
|---|---|---|
| Sample Selection | Hydro 2000S(A) | |
| Material | PTFE | |
| | Refractive Index | 1.38 |
| | Absorption | 0.1 |
| Dispersant Name | IPA | |
| | Refractive Index | 1.39 |
| | Absorption | 0.1 |
| Labels | Factory Settings | |
| Reports & Saving | Factory Settings | |
| Measurement | Measurement Time | 6 seconds |
| | Measurement Snaps | 6,000 |
| Background | Background Time | 6 seconds |
| | Background Snaps | 6,000 |
| Obscuration Limits | Low | 10% |
| | Upper | 20% |
| Sample Settings | Pump Speed | 1000 RPM |
| | Tip Displacement | 100% |
| | Ultrasonics | Checked pre-measurement 20 sec. |
| | Tank Fill | Manual |
| Cycles | Aliquots | Single |
| | Measurements | 2 per aliquot |
| | Cleaning | Before each aliquot (check enable) |
| | Clean Mode | Manual |
| | Measurement Cycle | Multiple |
| | Delay | 10 Seconds |

The Malvern Mastersizer system is then cleaned with IPA, as IPA is being used as the dispersant in the system. The appropriate refractive index values for both IPA and PTFE (shown in Table 3 above) are set on the Mastersizer, and the background is measured. Then, the sample of submicron PTFE powder dispersed in IPA is added to the Mastersizer until a message appears indicating that the requisite amount of sample has been added in order to properly measure the particle size of the PTFE particles.

The sonicator is then turned on at 50%, and the "start" button is pressed. The particle size measurements may be taken approximately 5 times (for example, once per minute for 5 minutes) in order to average out small deviations in the particle size measurements obtained.

Figure 2:
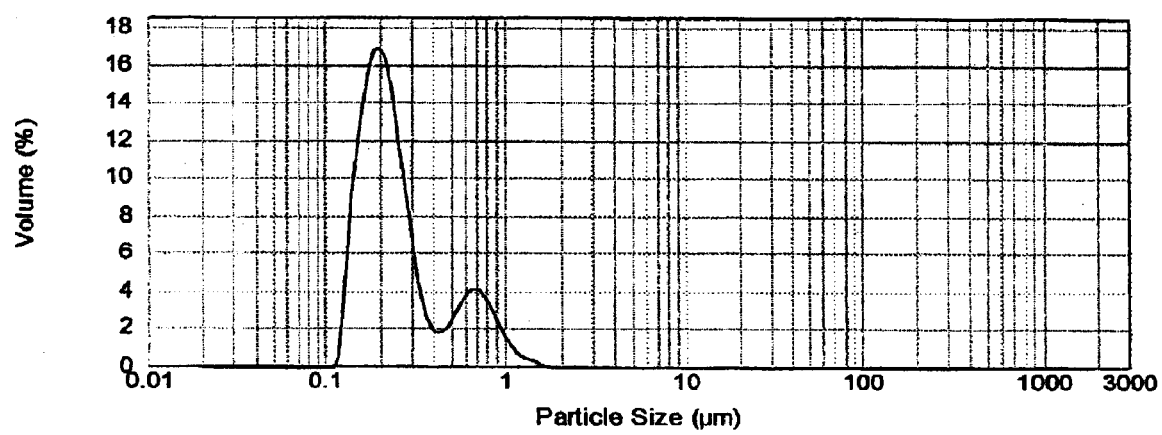
FIG. 2 shows a particle size distribution graph for a sample of submicron PTFE powder formed according to the present method and dispersed in IPA; particle size distribution is shown to be 97.89% below 1.00 $\mu$m.

In typical studies wherein particle size analysis is performed for samples of submicron PTFE powder formed according to the present method and dispersed in IPA, the results have shown that about 95% or more of the PTFE particles have a particle size of less than one micron. For example, FIG. 2 shows a particle size distribution graph for a sample of the submicron PTFE powder formed as disclosed herein and dispersed in IPA, and the distribution reveals that 97.89% of the PTFE particles are below 1.00 $\mu$m in size.

Additionally, the Malvern Mastersizer particle size analyzer may be used to determine the particle size of the submicron PTFE particles in embodiments where the dry PTFE powder formed according to the present method is dispersed in mineral oil. To prepare the carrier solution for such embodiments, about 15 mL of Lonzest SMO surfactant may be mixed with 1 gallon of a mineral oil, such as Magiesol Oil #47. Then, about 1 gram of the submicron PTFE powder may be placed in a plastic cuvette, and about 20 mL of the mineral oil carrier solution may be added to the cuvette. The mixture is then shaken for about 30 seconds. Subsequently, the sample is sonicated for 1 minute. In other embodiments, the sample of dispersed submicron PTFE powder to be tested is prepared by mixing about 2% by weight of the dry PTFE powder (formed according to the present method) into a mineral oil using either a blender or a high-speed disperser for about 3–5 minutes. About 5–10 drops of IPA and 5–10 drops of water may be added to the system.

The SOP is then set up on the Malvern Mastersizer for particle size analysis of samples of submicron PTFE powder dispersed in mineral oil. This SOP is shown in Table 4 below.

TABLE 4

SOP for Particle Size Analysis: Submicron PTFE Powder Dispersed in Mineral Oil

| Criteria | Setting | Value |
|---|---|---|
| Sample Selection | Hydro 2000S(A) | |
| Material | PTFE | |
| | Refractive Index | 1.38 |
| | Absorption | 0.1 |
| Dispersant Name | Mineral Oil | |
| | Refractive Index | 1.4 |
| | Absorption | 0.1 |
| Labels | Factory Settings | |
| Reports & Saving | Factory Settings | |
| Measurement | Measurement Time | 6 seconds |
| | Measurement Snaps | 6,000 |
| Background | Background Time | 6 seconds |
| | Background Snaps | 6,000 |
| Obscuration Limits | Low | 10% |
| | Upper | 20% |
| Sample Settings | Pump Speed | 1000 RPM |
| | Tip Displacement | 100% |
| | Ultrasonics | Checked pre-measurement 20 sec. |
| | Tank Fill | Manual |
| Cycles | Aliquots | Single |
| | Measurements | 2 per aliquot |
| | Cleaning | Before each aliquot (check enable) |
| | Clean Mode | Manual |
| | Measurement Cycle | Multiple |
| | Delay | 10 Seconds |

The Mastersizer's system is then cleaned first with IPA and then with the mineral oil carrier solution described above. The background is then measured. The sample containing submicron PTFE powder dispersed in the mineral oil solution is then added to the Mastersizer until a message appears indicating that enough of the sample has been added to measure the particle size of the PTFE particles. The sonicator is then turned on at 50%, and the "start" button is pressed. The particle size measurements may be repeated about 5 times (for example, after 1 minute for about 5–7 times) in order to average out small deviations in the particle size measurements obtained.

Figure 3:
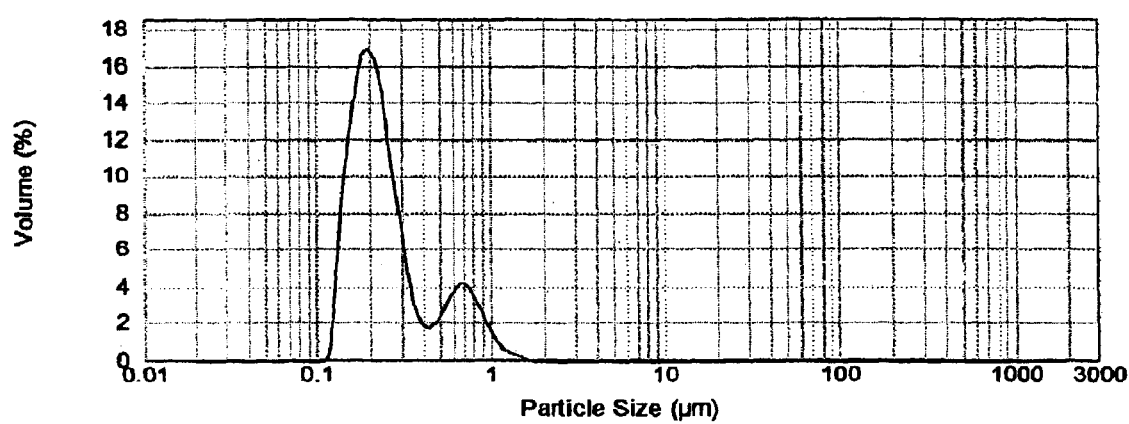
FIG. 3 shows a particle size distribution graph for a sample of submicron PTFE powder formed according to the present method and dispersed in mineral oil; particle size distribution is shown to be 98.07% below 1.00 $\mu$m.

Typical particle size analysis results for samples of submicron PTFE powder formed according to the present method and dispersed in mineral oil show that more than about 85 to 95% of the PTFE particles have a particle size of less than one micron. For example, FIG. 3 shows a particle size distribution graph for a sample of submicron PTFE powder formed according to the present method and dispersed in mineral oil, and the results reveal that the percentage of the PTFE particles below 1.00 µm in size is 98.07%.

Likewise, the Malvern Mastersizer may be used to determine the particle size of the submicron PTFE particles in embodiments where the dry PTFE powder is dispersed in water. Specifically, about 1 gram of the dry PTFE powder may be placed in a plastic 20 mL-capacity cuvette, to which 10 mL of IPA is added. The cuvette is then capped and shaken well, possibly for about 15 seconds. Then, 10 mL of water are added to the cuvette, and the contents are shaken for about 15 seconds. Subsequently, about 0.2 grams (or 10 drops from a pipette) of STGE surfactant is added to the cuvette. The cuvette is again capped and shaken for about 15 seconds. The cuvette is then opened, and the sample is sonicated for 1 minute. In other embodiments, about 2% by weight of the dry PTFE powder formed according to the present method is dispersed in a given volume of water, and about 2% by weight of the STGE surfactant is added. In such embodiments, the dispersion is mixed using either a blender or a high-speed disperser for about 3–5 minutes. Subsequently, a solution of about 98% water and about 2% STGE surfactant is prepared, which acts as the carrier solution.

The SOP used for the particle size analysis of samples of the submicron PTFE powder formed according to the present method and dispersed in water is outlined below in Table 5:

TABLE 5

SOP for Particle Size Analysis: Submicron PTFE Powder Dispersed in Water

| Criteria | Setting | Value |
|---|---|---|
| Sample Selection | Hydro 2000S(A) | |
| Material | PTFE | |
| | Refractive Index | 1.38 |
| | Absorption | 0.1 |
| Dispersant Name | Water | |
| | Refractive Index | 1.33 |
| | Absorption | 0.1 |
| Labels | Factory Settings | |
| Reports & Saving | Factory Settings | |
| Measurement | Measurement Time | 6 seconds |
| | Measurement Snaps | 6,000 |
| Background | Background Time | 6 seconds |
| | Background Snaps | 6,000 |
| Obscuration Limits | Low | 10% |
| | Upper | 20% |
| Sample Settings | Pump Speed | 1000 RPM |
| | Tip Displacement | 100% |
| | Ultrasonics | Checked pre-measurement 20 sec. |
| | Tank Fill | Manual |
| Cycles | Aliquots | Single |
| | Measurements | 2 per aliquot |
| | Cleaning | Before each aliquot (check enable) |
| | Clean Mode | Manual |
| | Measurement Cycle | Multiple |
| | Delay | 10 Seconds |

The Mastersizer's system is then cleaned with IPA, and the system is subsequently flushed with water twice. Then, 0.3 grams of the STGE surfactant are added to the Mastersizer system. The background is then measured. The sample containing the submicron PTFE powder dispersed in water is then added to the Mastersizer until a message appears indicating that enough sample has been added for particle size determination. The sonicator is then turned on at 50%, and the "start" button is pressed. Particle size measurements for the sample of submicron PTFE powder dispersed in water are typically taken about 5 times (for example, after 1 minute for about 5–7 times) in order to average out small deviations in the particle size measurements obtained.

Figure 4:
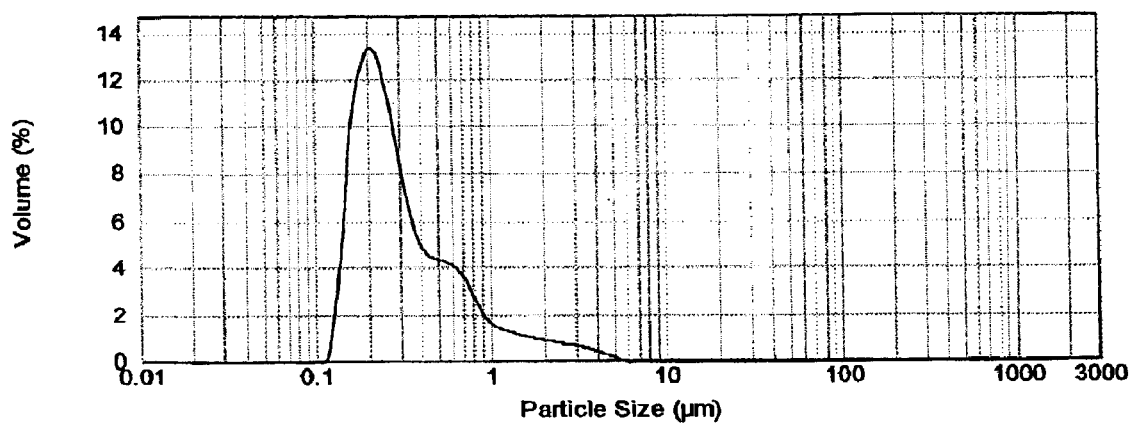
FIG. 4 shows a particle size distribution graph for a sample of submicron PTFE powder formed according to the present method and dispersed in water; particle size distribution is shown to be 91.09% below 1.00 $\mu$m.

Typically, particle size analyses of samples of submicron PTFE powder formed according to the present method and dispersed in water show particle size distributions wherein more than about 95% of the PTFE particles are less than one micron in size. For example, FIG. 4 shows a particle size distribution graph for a sample of the submicron PTFE powder formed according to the present method and dispersed in water, and the percentage of the particles below 1.00 $\mu$m in size is shown to be 91.09%.

The following examples are intended to illustrate the invention and should not be construed as limiting the invention in any way.

EXAMPLES

Example 1

Preparation and Particle Size Measurement of Submicron PTFE Powder; Solvent: IPA In the present Example, submicron PTFE powder was formed according to the following procedure: First, a solvent concentrate of submicron PTFE particles in IPA was prepared. Specifically, 25% by weight of Daikin F104 fine powder PTFE starting material (that had been irradiated at 28 megarads) was mixed with 75% by weight IPA. The irradiated PTFE starting material was gently added to the IPA while mixing using a high-speed mixer. Subsequently, the mixture of the PTFE starting material and IPA was ground using a horizontal media mill. The horizontal media mill employed in this Example used beads measuring from about 0.6 mm to about 0.8 mm in diameter, and the grinding took place at 3500 RPM. To prevent the PTFE particles from settling, this "pre-dispersion" of the PTFE starting material and the IPA solvent was consistently mixed until the first pass of grinding was complete.

After 5 passes of grinding using the horizontal media mill, the particle size of the PTFE particles was checked. It was found that the PTFE particles became submicron after about 7 to 10 passes using the horizontal media mill.

Once it was confirmed that the particle size of the PTFE particles was submicron, 1500 grams of the submicron PTFE/IPA dispersion prepared above was placed in a 5-gallon bucket. Three gallons of hot tap water were then added to the 5-gallon bucket while the dispersion was being mixed using a high-speed mixer at 3500 RPM. The mixing was allowed to continue for 10 minutes. Subsequently, the dispersion was allowed to sit for 10 minutes, after which it was filtered and dried in an oven heated to 60° C.

The resulting dry PTFE powder sample had a fluffy consistency. The sample was shaken in a plastic bag in order to break down the particles. (Alternatively, it is possible for the sample to be passed through an air mill for one pass in order to break down the particles.) After particle size analysis, the resulting PTFE powder was found to be submicron PTFE powder.

Example 2

Figure 5:
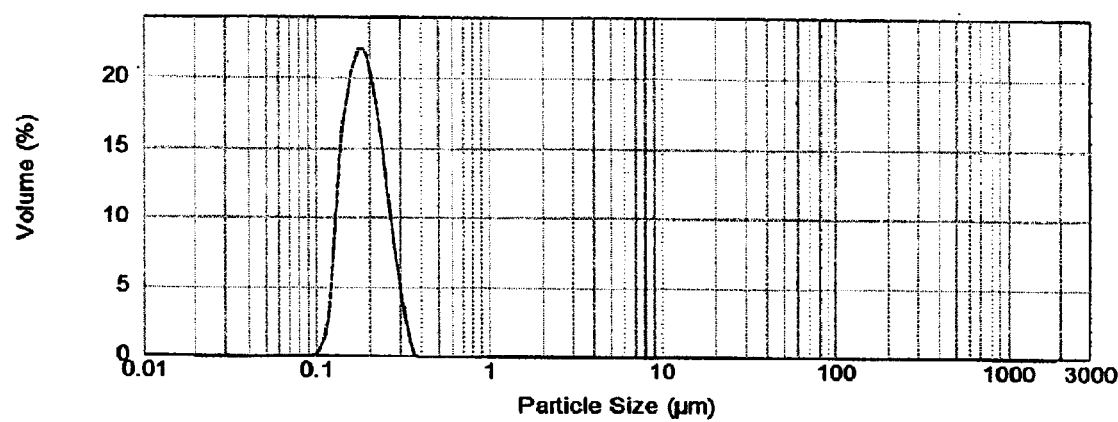
FIG. 5 shows a particle size distribution graph for a sample of submicron PTFE powder, wherein water/IPA was used as the solvent for grinding and wherein the submicron PTFE powder is dispersed in IPA; particle size distribution is shown to be 100.00% below 1.00 $\mu$m.

Preparation and Particle Size Measurement of Submicron PTFE Powder; Solvent: Water/IPA In the present Example, the exact same procedures described in Example 1 above were carried out; however, the solvent used for grinding consisted of 25% by weight tap water and 50% by weight IPA, while the amount of irradiated PTFE starting material used remained at 25% by weight. The resulting dry PTFE powder was then dispersed in IPA as the chosen dispersant. Particle size analysis was performed (using the method described in detail above wherein samples of submicron PTFE powder are dispersed in IPA), and it was determined that 100.00% of the PTFE particles were less than 1.00 $\mu$m in size. The particle size distribution graph for the present Example is shown as FIG. 5.

Example 3

Preparation and Particle Size Measurement of Submicron PTFE Powder; Solvent: Butyl Carbitol In this Example, the same procedures described in Example 1 above were followed, except that the solvent used for grinding was butyl carbitol rather than IPA. Thus, the starting mixture of irradiated PTFE starting material in the solvent comprised 25% by weight irradiated PTFE starting material and 75% by weight butyl carbitol.

Figure 6:
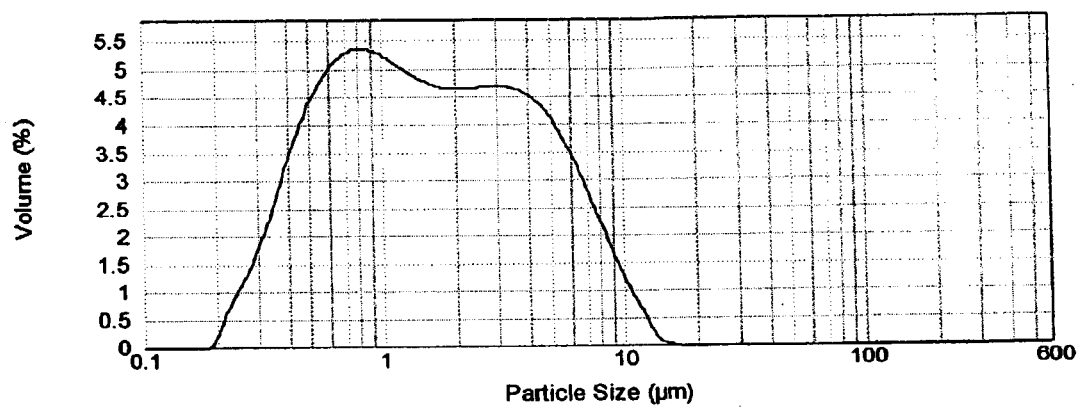
FIG. 6 shows a particle size distribution graph for a sample of dry PTFE powder formed according to the present method, wherein butyl carbitol was used as the solvent for grinding.

Particle size analysis was first performed on the dry PTFE powder produced in this Example (before it was subsequently dispersed into a liquid for the particles to become submicron size), and FIG. 6 shows the results of the particle size analysis of the dry PTFE powder of this Example. The particle size analysis results depicted in FIG. 6 were obtained using the method and Standard Operating Procedure for measuring the particle size of samples of dry PTFE powder (outlined in detail above), and the percentage of the PTFE particles below 1.00 $\mu$m in size was found to be 36.07%.

Figure 7:
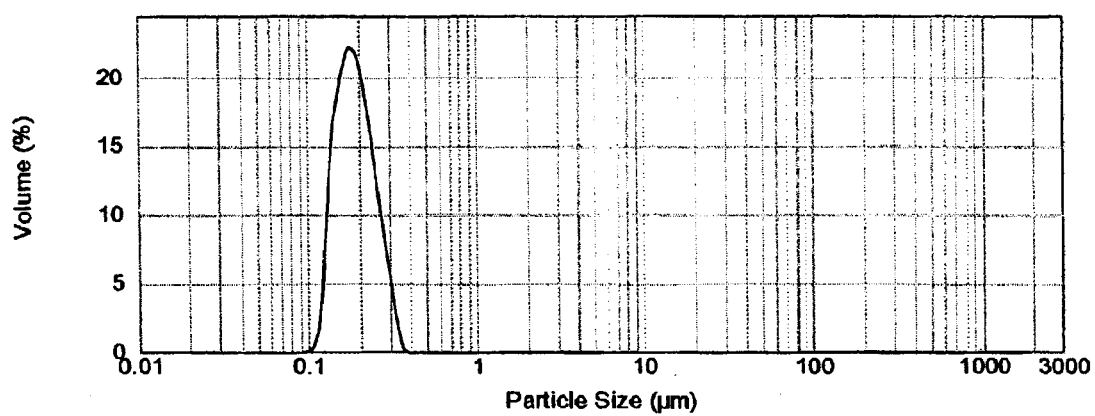
FIG. 7 shows a particle size distribution graph for a sample of submicron PTFE powder, wherein butyl carbitol was used as the solvent for grinding and wherein the submicron PTFE powder is dispersed in IPA; particle size distribution is shown to be 100.00% below 1.00 $\mu$m.

The dry PTFE powder formed in this Example was subsequently dispersed in IPA, the chosen dispersant, wherein the PTFE particles dispersed to submicron-size. Particle size analysis of the sample was then performed using the method and Standard Operating Procedure (outlined in detail above) for samples of submicron PTFE powder dispersed in IPA. As expected, FIG. 7 shows that for this sample of submicron PTFE powder dispersed in IPA, the percentage of the PTFE particles below 1.00 $\mu$m in size was 100.00%.

Example 4

Experiments to Determine Preferred Methods of Recovering Submicron PTFE Powder; Solvent: IPA In the present Example, 6 different experiments were performed in order to determine what methods of recovering the submicron PTFE powder from a dispersion of PTFE in IPA are preferred. In all 6 of the experiments, the PTFE starting material used was Daikin F104 fine powder PTFE starting material that had been irradiated at 28 megarads, and in all 6 experiments, the irradiated PTFE starting material was first placed into IPA, the chosen solvent for this Example.

The conditions under which the submicron PTFE powder was recovered for each of the 6 different samples are listed below in Table 6:

TABLE 6

| Experiment No. | PTFE Recovery Conditions |
| --- | --- |
| 4.1 | 100 grams of the dispersion of submicron PTFE in IPA was dried in an oven directly at 60° C. |
| 4.2 | Part of the PTFE/IPA dispersion was centrifuged at speed 90, and the PTFE/IPA cake was separated and removed. The recovered PTFE was then dried directly in an oven at 60° C. |
| 4.3 | Part of the PTFE/IPA dispersion was centrifuged at speed 90, and the PTFE/IPA cake was separated and removed. The PTFE was washed with water, filtered, and then dried directly in an oven at 60° C. |
| 4.4 | 100 grams of the dispersion of submicron PTFE in IPA was filtered with filter paper #1 and dried directly in an oven at 60° C. |
| 4.5 | 100 grams of the dispersion of submicron PTFE in IPA was filtered with filter paper #1. The PTFE was then washed with water, filtered again, and dried directly in an oven at 60° C. |
| 4.6 | 300 mL of hot tap water were added to 100 mL of the submicron PTFE/IPA dispersion, and a high speed disperser was used for 5 minutes at 4000 RPM to separate the PTFE from the IPA. The PTFE floated on the top of the water/IPA mixture, and it was filtered and then dried directly in an oven at 60° C. |

The six experiments all described in Table 6 above produced samples of dry PTFE powder. The six samples were each powdered using a Warring blender for 5 minutes at speed 4. Subsequently, samples of each of the six dry PTFE powders were dispersed in mineral oil by combining about 2% by weight of each dry PTFE powder and 2 drops of acetone with the mineral oil. The six mineral oil dispersals of the six different submicron PTFE powder samples were completed by mixing each of the six samples using a Warring blender for 5 minutes at speed 4.

Subsequently, particle size analysis was performed on each of the 6 samples to determine the extent to which the PTFE powder particles had dispersed to submicron particle size when dispersed in the mineral oil. Generally, the particle size analyses were performed using the method and Standard Operating Procedure (described in detail above) for samples of submicron PTFE powder dispersed in mineral oil. However, in each of the particle size analyses for this Example, 5 grams of the particular mineral oil dispersion of submicron PTFE powder was placed in a vial to which 15 grams of Magiesol mineral oil was added. Also, the QC Sonicator was used to sonicate each of the six prepared samples for 2 minutes each.

Next, each sample was added to the Mastersizer, and 5 drops of water were added to the mineral oil circulating in the Malvern Mastersizer. The samples were each allowed to run for one minute in order to measure particle size. Particle size was measured approximately 5–7 times for each sample in order to average out small deviations in the particle size measurements obtained.

Figure 8:
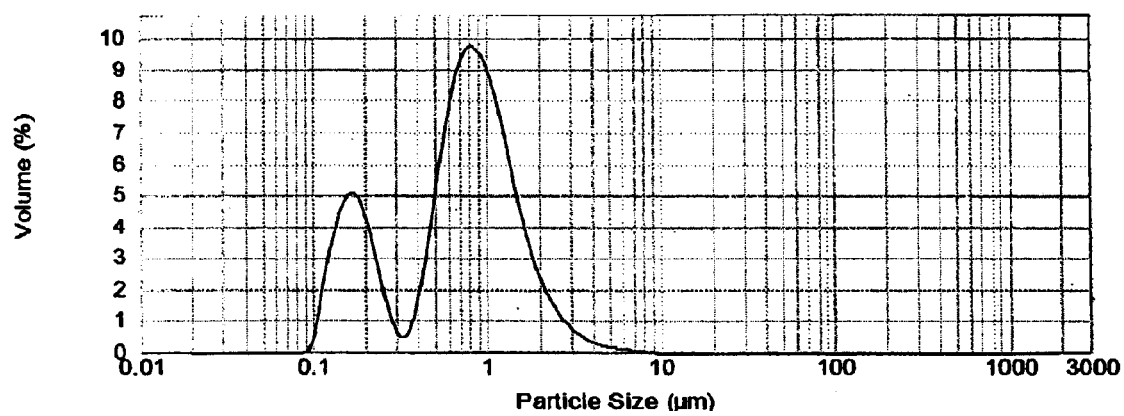
FIGS. 8–13 show particle size distribution graphs for samples of submicron PTFE powder, wherein IPA was used as the solvent for grinding, wherein the samples of submicron PTFE powder are dispersed in mineral oil, and wherein 6 different recovery methods were employed for comparison.
Figure 9:
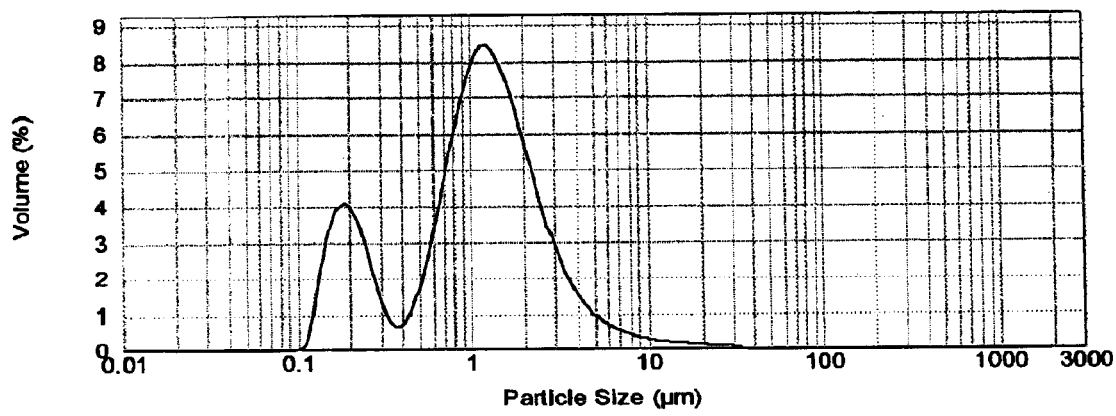
Figure 10:
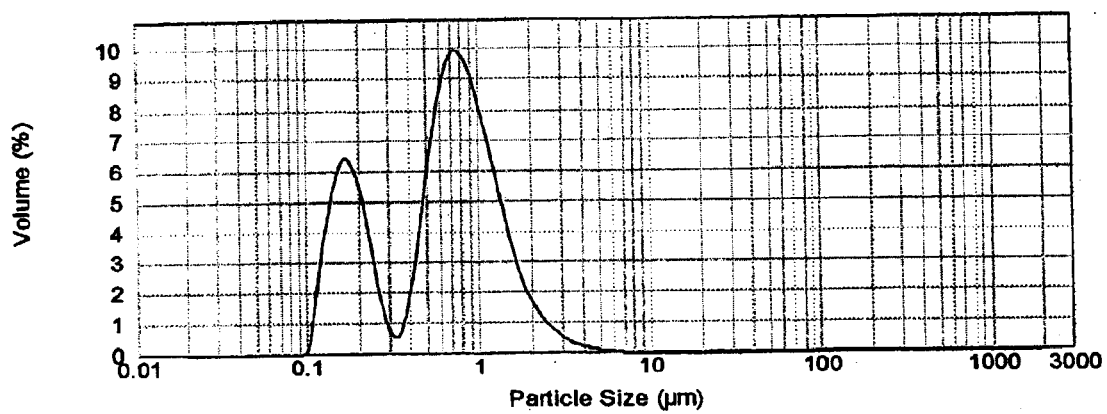

Particle size distribution graphs for each of the six experiments performed in this Example are shown in FIGS. 8–13. FIG. 8 shows that for Experiment 4.1, wherein the dispersion of submicron PTFE and IPA was directly evaporated in the oven, the percentage of the PTFE particles below 1.00 µm in size was 67.87%. Similarly, FIG. 9 shows that for Experiment 4.2, where the dispersion of PTFE in IPA was first centrifuged before the IPA was separated and the PTFE was dried, the percentage of the PTFE particles below 1.00 µm in size was 43.29%. FIG. 10 shows that the percentage of the PTFE particles below 1.00 µm in size was 74.59% for Experiment 4.3, wherein the PTFE dispersion in IPA was centrifuged and then washed and filtered before drying.

Figure 11:
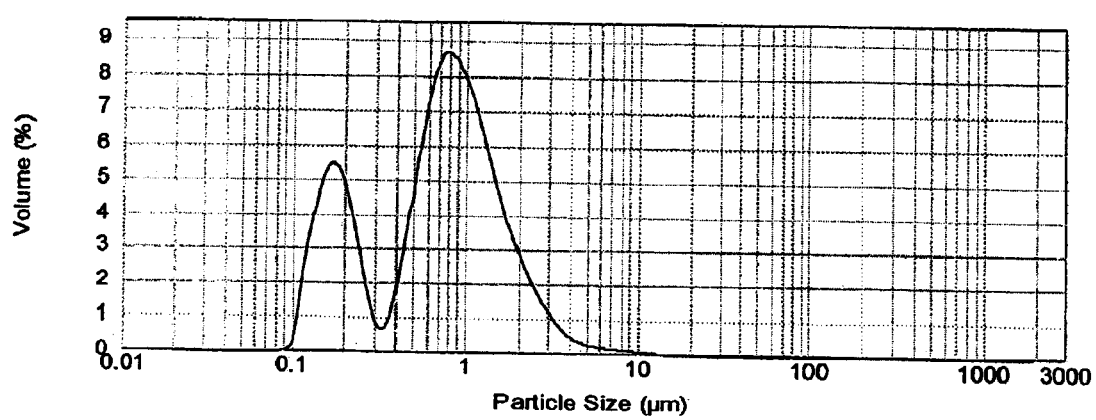
Figure 12:
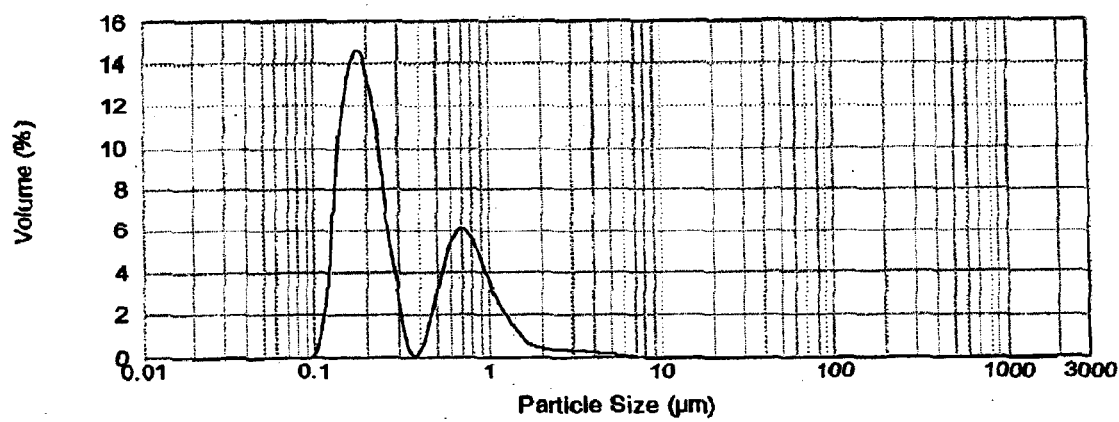
Figure 13:
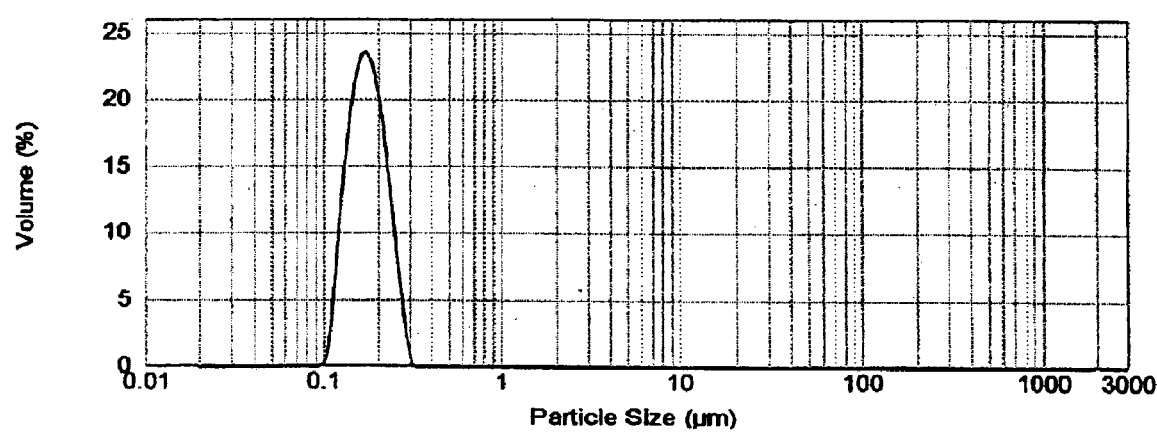

FIG. 11 shows the particle size distribution results for Experiment 4.4, wherein the PTFE dispersion in IPA was filtered with filter paper and dried. The percentage of the PTFE particles below 1.00 µm in size for Experiment 4.4 was 66.34%. For Experiment 4.5, wherein the PTFE/IPA dispersion was filtered and then washed and filtered again before drying, FIG. 12 shows that the percentage of the PTFE particles below 1.00 µm in size was 90.22%. Finally, for Experiment 4.6, wherein hot tap water was added to the PTFE/IPA submicron dispersion, a high speed disperser was used to separate the PTFE, and the PTFE was filtered before drying, the percentage of the PTFE particles below 1.00 µm in size was 100.00%, as shown in FIG. 13.

Clearly, all six methods of recovery described in this Example yield PTFE powder particles which are dispersible to submicron size. The best results were obtained with Experiment 4.6; however, with more intense agitation and/or longer agitation times, it is expected that 100% of the PTFE particles of all six of the samples would disperse in mineral oil to less than 1 µm in size.

Example 5

Sieving Tests Performed on Dry Submicron PTFE Powder Particles

In the present Example, a sieving test was performed to determine how much of the dry PTFE powder formed according to the present method (before dispersal to submicron size in a given application system) passed through various screen meshes. This testing served to indicate the particle size of the dry PTFE powder particles before dispersion. A Micron Air Jet sieve was used to perform these sieving tests on the dry PTFE powder particles. Four different screen meshes were used, and 10 gram samples of the dry PTFE powder formed according to the present method were tested with each screen. The Micron Air Jet sieve was allowed to run for 3 minutes during each test. The results of these sieving tests are shown in Table 7 below:

TABLE 7

| | Screen Size | | | |
| --- | --- | --- | --- | --- |
| | 500 mesh (25 µm) | 400 mesh (38 µm) | 270 mesh (53 µm) | 200 mesh (75 µm) |
| % of PTFE Passed Through the Screen | 56% | 69% | 85% | 91% |

The results shown in Table 7 above indicate the relative size of the dry PTFE particles after powdering and confirm the free-flowing nature of the PTFE particles. It is unexpected that a free-flowing, non-dusting PTFE powder with a particle size range of from about 5 to about 75 µm would be readily dispersible to submicron size in various application systems with only low levels of incorporation mixing required.

Example 6

Comparative Sieving Test Performed on Non-Irradiated PTFE Starting Material

The present Example serves as a comparative example with respect to Example 5 above. Specifically, in the present Example, a sieving test was performed on a sample of non-irradiated PTFE starting material that had not undergone the method of the present invention. Exactly 10 grams of Daikin F104 fine powder PTFE starting material was used, and the sieving test was performed to determine how much of the PTFE was able to pass through various screen meshes. A Micron Air Jet sieve was used to perform this sieving test, and four different screen meshes were used. Specifically, the four screen meshes used were 200 mesh, 270 mesh, 400 mesh, and 500 mesh (in that order), and the PTFE sample was placed on the 200 mesh. The Micron Air Jet sieve was allowed to run for 3 minutes during the test. The results of this sieving test are shown in Table 8 below:

TABLE 8

| | Screen Size | | | |
|---|---|---|---|---|
| | 500 mesh (25 µm) | 400 mesh (38 µm) | 270 mesh (53 µm) | 200 mesh (75 µm) |
| % of PTFE Passed Through the Screen | 0% | 0% | 0% | 0% |

The results shown in Table 8 above indicate that none of the non-irradiated PTFE particles in the sample even passed through the 200 mesh screen. Thus, these results indicate that Daikin F104 fine powder PTFE starting material is very sticky, is not free-flowing, and is unable to pass through sieves that allow particles of up to 75 µm in size to pass through. Therefore, it is clear that the submicron PTFE powder formed according to the present invention (such as the submicron PTFE powder analyzed and sieved in Example 5 above) exhibits many advantages, including a tendency to be free-flowing, non-dusting, and readily dispersible into various application systems.

Example 7

Particle Size Analysis of PTFE Starting Material After Mixing in a Ball Mill The present Example also serves as a comparative example in that the PTFE samples analyzed herein had not undergone the method of the present invention which includes grinding the solvent concentrate of PTFE particles. Specifically, in this Example, the mixability of PTFE particles in a ball mill was tested for samples of both irradiated PTFE starting material and non-irradiated PTFE starting material. The PTFE starting material used in this Example was the Daikin F104 fine powder PTFE starting material previously mentioned above, and Sample 7.1 of the PTFE starting material was irradiated at 28 megarads while Sample 7.2 of the PTFE starting material was not irradiated.

First, about 20% by weight of the irradiated PTFE starting material (Sample 7.1) was added to about 80% by weight IPA in the special container used with the ball mill, and the container was closed. (The ball mill employed herein was the Reliance Electric 5.200, Duty Master, manufactured by Reliance Electric Industry Company in Cleveland, Ohio, and the ball mill was used at a speed of about 1725 RPM.) No beads were added to the container holding the sample. The container was placed on the roll of the ball mill, and the mill was turned on and allowed to run for about 40 minutes. The mill was then turned off, and the container was opened in order for the sample to be further analyzed.

Figure 14:
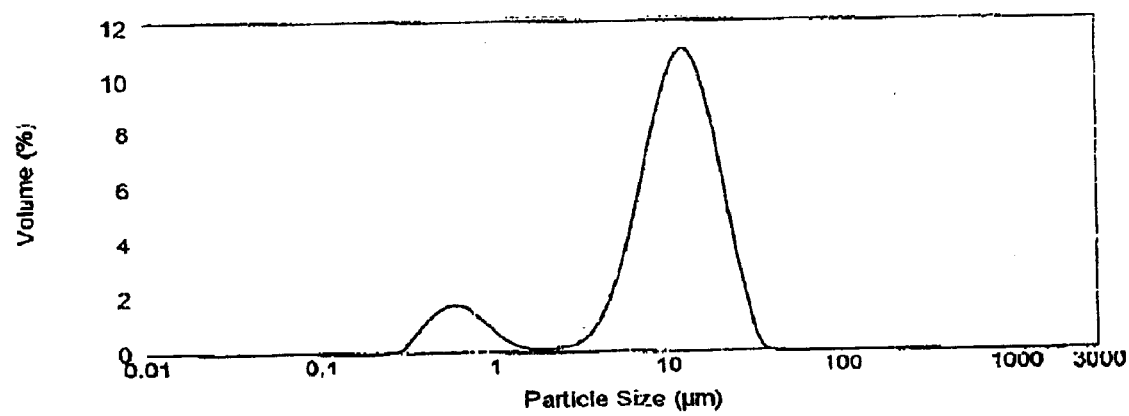
FIG. 14 shows a particle size distribution graph for a sample of irradiated PTFE starting material that was mixed in a ball mill with IPA as the solvent.

The PTFE in Sample 7.1 had settled to the bottom of the container and was allowed to fully separate from the IPA. As soon as the PTFE had fully separated from the IPA, the PTFE was recovered for particle size analysis. Specifically, Sample 7.1 was decanted in order to remove the clear IPA and collect the PTFE. The PTFE collected was then weighed and added to tap water at a ratio of about 1:4 by weight of PTFE collected to tap water. Next, the warring blender was used at speed 4 for about 2 minutes in order to mix the PTFE and the water. After the blender was stopped, the PTFE floated on top of the water. Subsequently, the PTFE was filtered and then dried in an oven at a temperature of about 50° C. The method and Standard Operating Procedure for measuring the particle size of dry PTFE powder samples (described in detail above) were used to determine the particle size distribution for Sample 7.1. FIG. 14 shows the particle size distribution graph for Sample 7.1, and the percentage of the PTFE particles below 1.00 µm in size was found to be 9.80%.

An important part of this "comparative" Example involves the fact that Sample 7.1 was sonicated using the QC Sonicator at 50% for a total of 6 minutes. (Note how the PTFE sample analyzed in Experiment 4.6 above was only sonicated for a total of 2 minutes, and the results in FIG. 13 showed that the percentage of PTFE particles below 1.00 µm in size was 100.00%). Thus, the present Example shows that even with 3 times the amount of sonic treatment allowed for during preferred methods of the present invention, a sample of PTFE starting material that has been irradiated at 28 megarads (such as Sample 7.1) and has not undergone the method of the present invention involving the grinding step does not effectively disperse to PTFE particles of submicron size.

Figure 15:
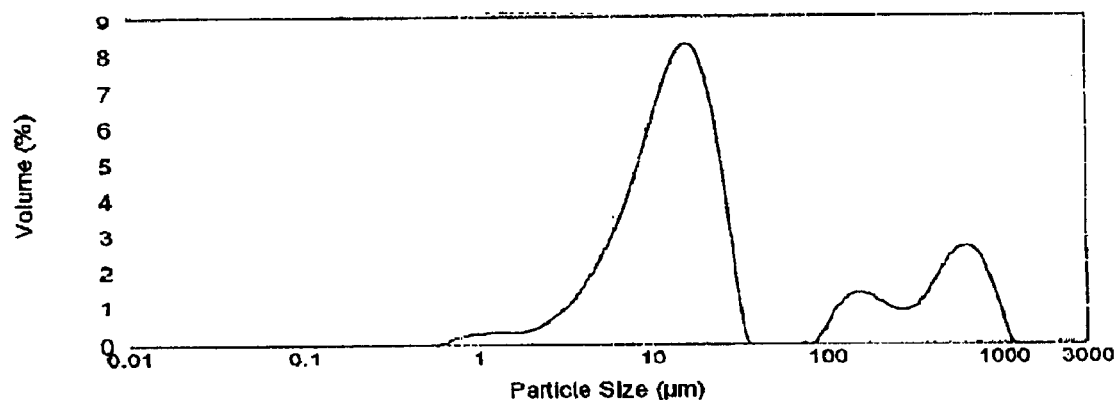
FIG. 15 shows a particle size distribution graph for a sample of non-irradiated PTFE starting material that was mixed in a ball mill with IPA as the solvent.

The exact same procedures described above in this Example were carried out for Sample 7.2, the non-irradiated sample of the PTFE starting material, and particle size analysis was performed on the resulting PTFE powder product from Sample 7.2. FIG. 15 shows the particle size distribution graph for Sample 7.2, and the percentage of the PTFE particles below 1.00 µm in size was determined to be 0.61%. Similarly to Sample 7.1, Sample 7.2 was sonicated using the QC Sonicator at 50% for a total of 6 minutes. Thus, the present Example shows that even with 3 times the amount of sonic treatment allowed for during preferred methods of the present invention, a sample of PTFE starting material (such as Sample 7.2) that has not been irradiated and that has not undergone the method of the present invention involving the grinding step does not effectively disperse to PTFE particles of submicron size.

Thus, the results of this Example (when compared to the results shown for Experiment 4.6 and FIG. 13 above) indicate that the PTFE powder particles produced for both Sample 7.1 and Sample 7.2 would not be dispersible to submicron size even when significantly more time is allowed for dispersion.

Example 8

Formation of a Stable Organic Dispersion of PTFE Particles

In the present Example, a dispersion of submicron PTFE particles was formed using an organic medium as the dispersant for the PTFE particles. Specifically, the PTFE starting material used was the Daikin F104 fine powder starting material, and the sample used was irradiated at 28 megarads. A formulation was prepared which included: 25% by weight irradiated Daikin F104 PTFE starting material; 68% by weight hydrogenated polyisobutene as the organic dispersant (specifically Panalin L-14E manufactured by Amoco); 2% by weight odor-free fluorosurfactant (specifically, FC740, manufactured by 3M); and 5% by weight nonionicpolymer (specifically, Hypermer B206, manufactured by ICI).

In this Example, the entire amount (2% by weight) of the fluorosurfactant and only 4% by weight of the Hypermer B206 were added to 30% by weight of the Panalin L-14E oil. The entire amount (25% by weight) of the irradiated PTFE starting material was then slowly added to the Panalin L-14E oil mixture to make the "pre-dispersion." Subsequently, this pre-dispersion was ground in a media mill for 13 passes at a speed of 1700 RPM, at the rate of 40 pounds/hour. (The media mill employed in the present Example was the Red Head Media Mill, Model L-2, Serial No. 81-J-1496-6, using 16 ounces of ceramic beads having diameters of about 1.6 mm to 2.2 mm.)

After 13 passes of the media mill, the particle size of the PTFE particles in the pre-dispersion was checked using the Microtrac particle size analyzer to perform particle size analysis. At this point the mean value of the PTFE particle size should be less than 0.7 $\mu$m, and about 90% of the PTFE particles should be below 1.00 $\mu$m in size.

Subsequently, the rest of the Panalin L-14E oil (the remaining 38% by weight) and the rest of the Hypermer B206 (the remaining 1% by weight) were added to the pre-dispersion, and the final mixture was ground in the media mill for another 2 passes to produce the final PTFE dispersion. This final PTFE dispersion in the Panalin L-14E oil was observed to be free of aromatic hydrocarbon odor.

Four 4-ounce samples (denoted herein as Samples 8.1–8.4) of the final PTFE dispersion in the Panalin L-14E oil were tested to determine the particle size distribution of the samples. The particle size analysis was performed on each of the 4 samples using a Microtrac particle size analyzer.

Figure 16:
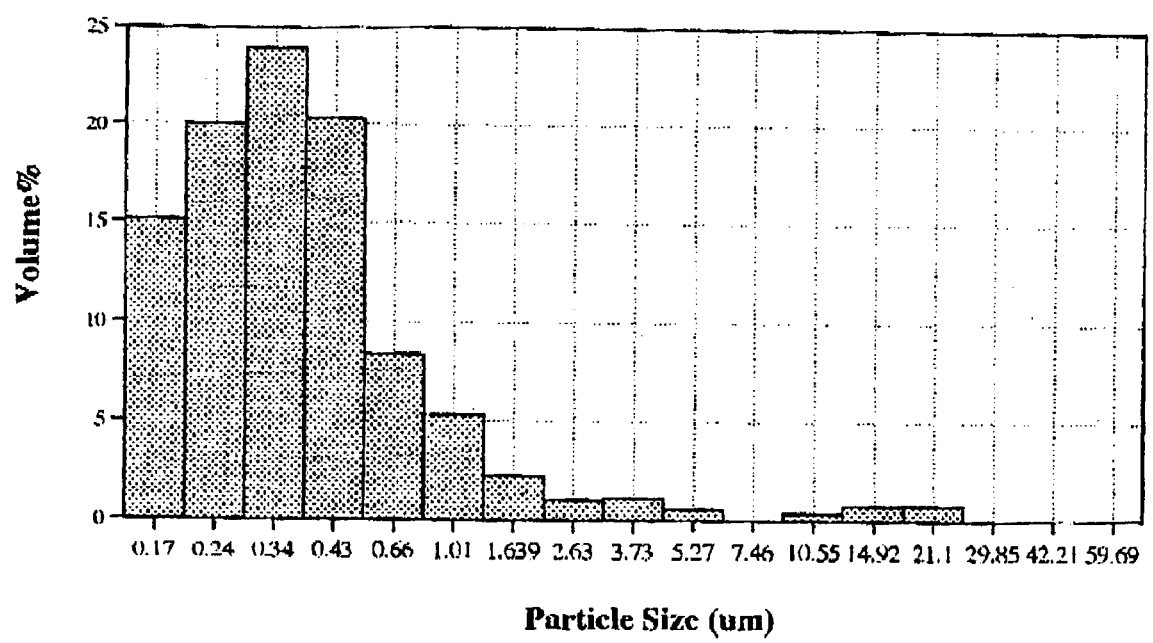
FIG. 16 shows a particle size distribution graph (generated using the Microtrac particle size analyzer) for a sample from an organic dispersion of PTFE particles formed according to the present invention; particle size distribution is shown to be more than 90% below 0.81 $\mu$m.

Sample 8.1 was found to have a PTFE concentration of 25.75% and a mean particle size value of 0.33 $\mu$m. The percentage of PTFE particles in Sample 8.1 below 1.00 $\mu$m in size was found to be 98.3%. Sample 8.2 was found to have a PTFE concentration of 25.60% and a mean particle size value of 0.74 $\mu$m. The percentage of PTFE particles in Sample 8.2 below 1.00 $\mu$m in size was found to be 92.0%. Sample 8.3 was found to have a PTFE concentration of 25.00% and a mean particle size value of 0.68 $\mu$m. The percentage of PTFE particles in Sample 8.3 below 1.00 $\mu$m in size was found to be 91.5%. For Sample 8.4, the mean particle size value was found to be 0.68 $\mu$m, and more than 90% of the PTFE particles in Sample 8.4 were found to be below 0.81 $\mu$m in size. Sample 8.4 was found to have a PTFE concentration of 21.452%. A particle size distribution graph for Sample 8.4 that was generated using the Microtrac particle size analyzer is shown as FIG. 16. This graph confirms that a large majority of the PTFE particles were below 1.00 $\mu$m in size and that specifically, more than 90% of the PTFE particles in the sample were below 0.81 $\mu$m in size.

Thus, the results of this Example show that a dispersion of submicron PTFE particles may be formed according to the method of the present invention whereby the PTFE particles in a sample of irradiated PTFE starting material are dispersed to submicron size in an organic medium (such as the Panalin L-14E oil) through grinding using a media mill.

Example 9

Formation of a Stable Aqueous Dispersion of PTFE Particles

In the present Example, an aqueous dispersion of PTFE particles was formed. Specifically, the formulation of the dispersion is outlined below in Table 9.

TABLE 9

|  | Composition (% by weight) | Batch Weight (lbs) | Drum Weight (lbs) |
| --- | --- | --- | --- |
| Total Size |  | 1600 | 500 |
| Filtered Water | 45.53% | 728.48 | 227.65 |
| Sodium Bicarbonate | 1.80% | 28.80 | 9.00 |
| STGE Surfactant | 2.00% | 32 | 10 |
| Disperbyk 181 | 0.40% | 6.4 | 2 |
| Nuosept 95 | 0.02% | 0.32 | 0.1 |
| Pemulen 1522 | 0.25% | 4 | 1.25 |
| PTFE Starting Material (Irradiated) | 50.00% | 800 | 250 |
| Total | 100.00% | 1600.00 | 500.00 |

The equipment involved in this Example included a 250-gallon tank with a propeller blade mixer. Also, the apparatus used for grinding was the Red Head Media Mill, which used zirconia silicate grinding beads having diameters of from about 1.6 to 2.2 mm.

The following procedure was carried out (based on a 1600 lb total batch weight basis). The filtered tap water was placed into the 250-gallon tank, and the propeller blade mixer was started at a speed of 900 RPM to begin the mixing. Then, the sodium bicarbonate was added and mixed for about 15 minutes until the mixture was clear. The pH of the mixture was then recorded, and the pH at this point should be between about 7.5 and 9.0. Subsequently, the STGE surfactant, the Disperbyk 181, and the Nuosept 95 were added to the mixture, respectively. This mixture was mixed at a speed of 900 RPM for about 10 minutes.

Subsequently, the Pemulen 1622 was gradually sifted into the mixture, and the mixture was mixed for about 1 hour at a speed of 1450 RPM. Then, the irradiated PTFE starting material was added to the mixture, and the speed of the agitator was raised to about 1550 RPM. The dispersion was mixed for about 45 minutes until it seemed to be free of lumps. The agitator speed was then turned down to 1300 RPM before the mixture was discharged to the media mill for grinding.

Figure 17:
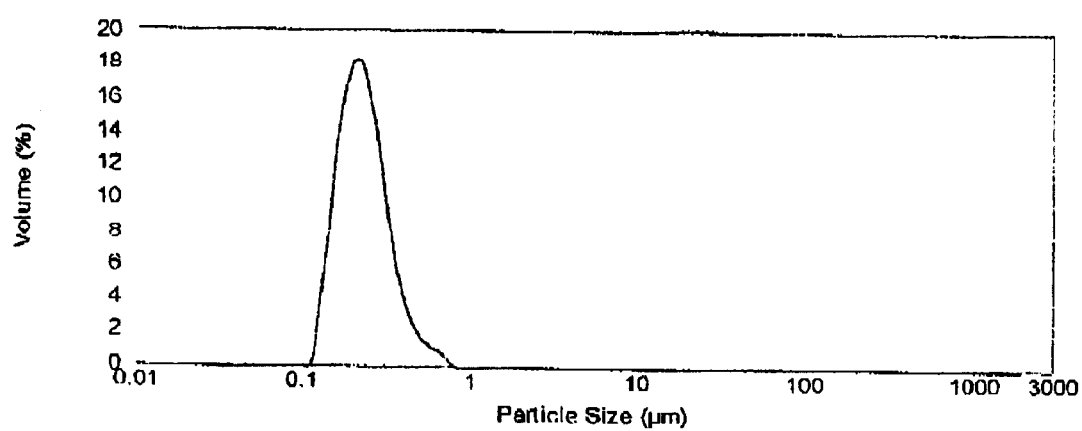
FIG. 17 shows a particle size distribution graph for a sample from a large-scale aqueous dispersion of PTFE particles formed according to the present invention; particle size distribution is shown to be 100.00% below 1.00 $\mu$m.

The grinding of the aqueous PTFE dispersion took place using the Red Head Media Mill. First, it was confirmed that the cooling water for the system had been turned on. Next, the valves from the rear mixer kettle were opened, and the dispersion was allowed to run through the media mill. The pump speed was set so as to give about 5–8 psig, and the dispersion was fed from the outlet of the media mill back to the rear mixer kettle. The media mill was allowed to run through 2 additional passes. Subsequently, particle size analysis of samples of the dispersion was performed to determine the size of the PTFE particles. The media mill was allowed to go through repeat passes until particle size analysis results showed that the PTFE particles had reached submicron in size. A particle size distribution graph for a sample of the aqueous PTFE dispersion made according to the present Example is shown as FIG. 17, and the percentage of PTFE particles having a particle size below 1.00 $\mu$m was found to be 100.00%. Thus, the results of this Example show that a large-scale aqueous dispersion of PTFE particles may be formed according to the present invention whereby irradiated PTFE starting material is dispersed into an aqueous dispersal medium and ground using a media mill.

Example 10

Particle Size Comparison of PTFE Powder Samples

In the present Example, particle size analysis was performed on two samples of PTFE powder to compare the results. Specifically, the comparison was performed using Sample 10.1, a sample of the submicron PTFE powder formed according to a method described by the present invention, and Sample 10.2, a sample of irradiated PTFE starting material that had not undergone the method disclosed in the present invention which involves grinding of the PTFE particles in the solvent.

Figure 18:
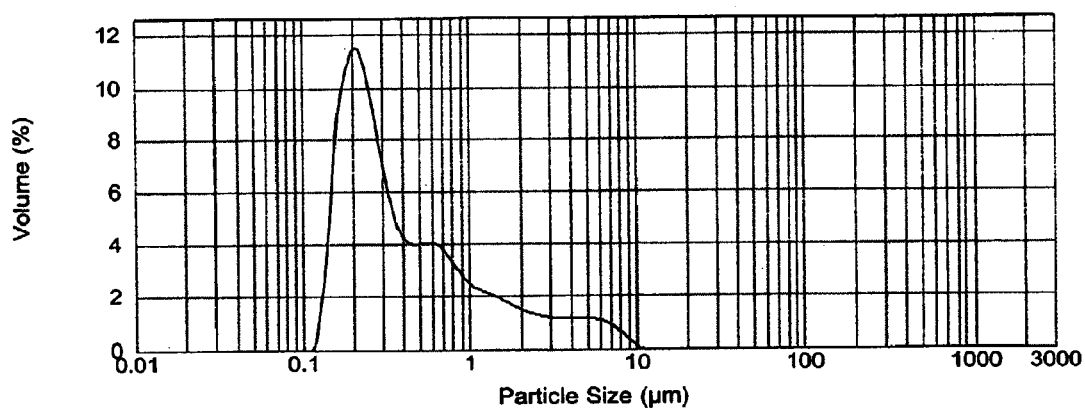
FIG. 18 shows a particle size distribution graph for a sample of submicron PTFE powder formed according to the present invention, wherein IPA was used as the solvent for grinding and wherein the submicron PTFE powder is dispersed in a mixture of IPA and water; particle size distribution is shown to be 80.51% below 1.00 $\mu$m.

Sample 10.1 was a sample of submicron PTFE powder that had formed according to the method for making dry submicron PTFE powder described by the present invention. Specifically, a sample of the Daikin F104 fine powder PTFE starting material was first irradiated at 28 megarads and then added to IPA as the solvent for grinding. Grinding was performed, and the PTFE was filtered and dried. The resulting dry PTFE powder was dispersed in a mixture of IPA and water in order for the particle size analysis to be performed using the Malvern Mastersizer. As shown in FIG. 18, the particle size analysis of Sample 10.1 revealed that 80.51% of the PTFE particles in the sample were below 1.00 $\mu$m in size. The average particle size of the PTFE particles in Sample 10.1 was found to be 0.861 $\mu$m.

Figure 19:
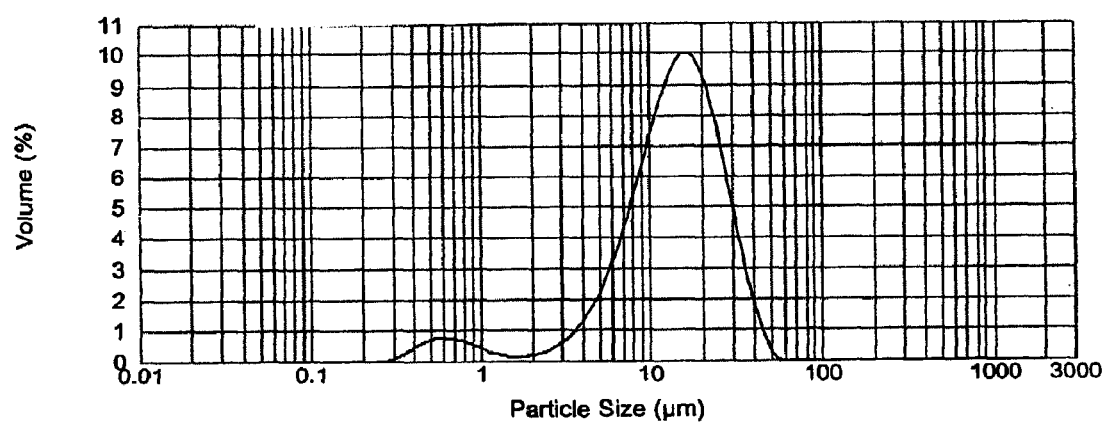
FIG. 19 shows a particle size distribution graph for a sample of PTFE starting material that was irradiated at 28 megarads, did not undergo grinding, and was dispersed in a mixture of IPA and water; particle size distribution is shown to be 4.27% below 1.00 $\mu$m.

Sample 10.2 was a sample of the Daikin F104 fine powder PTFE starting material, which had been irradiated at 28 megarads and was baked in order to remove HF by-product molecules from the system. Sample 10.2 was not ground and therefore did not undergo the method described herein for making submicron PTFE powder that involves a grinding step. The irradiated sample of PTFE starting material was dispersed in a mixture of IPA and water in order for particle size analysis to be performed using the Malvern Mastersizer. As shown in FIG. 19, the particle size distribution for Sample 10.2 showed that 4.27% of the PTFE particles were below 1.00 $\mu$m in size. It is anticipated that had Sample 10.2 been irradiated at a higher intensity, for example, more than 70 megarads, the dispersibility of the irradiated PTFE particles to submicron size would have significantly increased.

Example 11

Particle Size Analysis of Submicron PTFE Powder/ Dispersion Formed via Irradiation and Dispersion In the present Example, a submicron PTFE powder is formed according to the embodiments described herein which involve only irradiation of the appropriate PTFE starting material and dispersion of the irradiated PTFE powder to submicron sized particles in a given application system. Specifically, in this Example, a drum of PTFE starting material (such as Daikin F104 fine powder PTFE starting material) is acquired and stored at a temperature below 0° C. A small sample of the PTFE starting material (for example, about 4 ounces) is allowed to warm up to room temperature, which may be about 30° C. At this time, a finger rub test is performed in order to compare the stickiness of a sample of the PTFE starting material kept at 0° C. with the stickiness of a sample of the PTFE starting material allowed to warm up to room temperature.

Subsequently, two 40-lb. samples of the Daikin F104 PTFE starting material are prepared in identical trays, and Sample 11.1 is kept at the initial temperature of below 0° C., while Sample 11.2 is kept at room temperature (about 30° C). Samples 11.1 and 11.2 are then irradiated at an intensity of about 70 megarads. The irradiated PTFE starting material samples are then tested to determine how readily the PTFE particles disperse to submicron size. This is accomplished by placing each irradiated sample into a 50/50 mixture of IPA and water (with the addition of STGE surfactant) in order to perform particle size analysis. Particle size analysis is then performed using the Malvern Mastersizer, and it is expected that the particle size distribution for Sample 11.1 (that was consistently kept at a temperature of below 0° C.) shows a greater percentage of PTFE particles below 1.00 $\mu$m in size than Sample 11.2, which was allowed to reach room temperature. Overall, it is anticipated that both Samples 11.1 and 11.2 readily disperse to samples comprising PTFE particles of submicron size. To further analyze Samples 11.1 and 11.2, infrared spectroscopy measurements are taken for each sample to perform functional group analysis on the samples. In addition, DSC is performed in order to determine the phase transition temperatures and melting points for these samples.

Example 12

Determination of the Correlation between PTFE Dispersibility and Melt Index

In this Example, Daikin F104 fine powder is used as the chosen PTFE starting material, and this PTFE starting material is constantly kept at a temperature of below 0° C. Six 40 lb. samples of the PTFE starting material (Samples 12.1–12.6) are placed into identical trays. Subsequently, the six samples are irradiated (at room temperature, which is about 30° C.) at varying intensities, which are listed below in Table 10.

TABLE 10

| Sample No. | Irradiation Intensity (Megarads) |
|---|---|
| 12.1 | 10 |
| 12.2 | 20 |
| 12.3 | 40 |
| 12.4 | 80 |
| 12.5 | 100 |
| 12.6 | 120 |

Subsequently, each of the irradiated PTFE samples is placed into a 50/50 mixture of IPA and water (with the addition of a small amount of STGE surfactant) in order to perform particle size analysis on each sample and thereby determine how readily the PTFE particles in the irradiated PTFE samples disperse to submicron size when the samples are placed in the IPA/water application system. The particle size distribution data is then used to determine the correlation between how dispersible the irradiated PTFE particles are as compared with the melt index of the various samples (based on the intensity of the irradiation to which the particular sample was subjected). Thus, the present Example allows for the determination of the optimal amount of irradiation that is preferred in embodiments of the present invention wherein a dispersion of submicron PTFE particles is formed by irradiating the PTFE starting material and dispersing the irradiation PTFE starting material in the desired application system.

Example 13

Particle Size Analysis of PTFE Dispersions After Irradiation at 72 Megarads

In the present Example, dispersions of PTFE particles were formed according to certain embodiments of the present invention. Specifically, 7 samples of PTFE fine powder starting material, specifically Daikin F104 PTFE starting material were first irradiated at an intensity of 72 megarads. Subsequently, each of the 7 irradiated PTFE fine powder samples was passed through an air mill for one pass in order to break down the PTFE agglomerates.

Particle size analysis of each of the irradiated PTFE powder samples was then performed, wherein 1 gram of each of the 7 samples was placed in a separate plastic vial and wherein 10 grams of IPA, 10 grams of water, and 0.2 grams (or 10 drops) of STGE surfactant were added to each of the 7 samples. Each of the vials containing the dispersion of the irradiated PTFE sample in a mixture of IPA and water was subsequently shaken, possibly for about 30 seconds to about 1 minute. Then, each of the 7 samples was sonicated using the QC Sonicator for about 1 minute.

The Malvern Mastersizer was used to perform the particle size analysis of the PTFE particles dispersed in the IPA/water mixture. Specifically, the Malvern Mastersizer system was first cleaned with IPA after which the system was flushed twice with water. About 0.3 grams of STGE surfactant was added to the water system in the Mastersizer. The required amount of each of the 7 PTFE dispersion samples was added dropwise to the Mastersizer in order to perform particle size analysis. The Mastersizer was allowed to run for 2 minutes, and the particle size results for the 7 samples are shown below in Table 11.

TABLE 11

| Sample No. | Mean Value Particle Size (μm) | Percentage of PTFE Particles Below 1.00 μm |
|---|---|---|
| 13.1 | 5.245 | 47.52 |
| 13.2 | 2.363 | 68.38 |
| 13.3 | 1.735 | 69.00 |
| 13.4 | 1.819 | 72.22 |
| 13.5 | 3.095 | 86.63 |
| 13.6 | 4.002 | 68.98 |
| 13.7 | 2.004 | 72.31 |

The results in Table 11 above show that for samples of PTFE fine powder starting material that have been irradiated at 72 megarads and subsequently dispersed in a mixture of IPA and water without employing a grinding step, the PTFE particles in the powder samples exhibit a substantial tendency to disperse to submicron size. Thus, as mentioned earlier, it is anticipated that higher levels of irradiation, for example, irradiation intensities of about 72 megarads, serve to reduce the amount of agitation and mechanical energy required to disperse a sample of PTFE powder to submicron size.

We claim:

1. A method for producing submicron polytetrafluoroethylene (PTFE) powder comprising the following steps:

(a) selecting a PTFE starting material;

(b) irradiating said PTFE starting material at an intensity of from about 5 to about 120 megarads;

(c) adding the irradiated PTFE starting material to a solvent to form a mixture;

(d) grinding and/or de-agglomerating said mixture of said irradiated PTFE starting material and said solvent until the PTFE particles are submicron in size, wherein more than about 50% of said PTFE particles are less than 1.00 μm in size;

(e) recovering said PTFE particles from said ground and/or de-agglomerated mixture of said irradiated PTFE starting material and said solvent;

(f) drying the recovered PTFE particles;

(g) powdering the recovered, dried PTFE particles, wherein a dry PTFE powder results having an average agglomerate PTFE particle size of from about less than 1.00 μm to about 100 μm, and wherein said dry PTFE powder is readily dispersible, in a desired application system, so that more than about 50% of the PTFE particles are below 1.00 μm in size when said dry PTFE powder is dispersed in a desired application system.

2. The method of claim 1 wherein said PTFE starting material is a member of the group consisting of a fine powder PTFE, a coagulated dispersion of PTFE, and a PTFE starting material formed as a result of emulsion polymerization.

3. The method of claim 1 wherein said addition of said irradiated PTFE starting material to a solvent takes place without the addition of any surfactant, wetting agent, rheology agent, or pH-adjusting agent.

4. The method of claim 1 wherein said recovery method is selected from the group of methods consisting of filtration, centrifugation, evaporation, critical gas extraction, and co-mingling with other fluids to remove said solvent, followed by filtration and/or centrifugation.

5. The method according to claim 1, wherein said PTFE starting material comprises polytetrafluoroethylene or a polytetrafluoroethylene copolymer wherein the bulk of the copolymer material is polytetrafluoroethylene.

6. The method according to claim 1, further comprising the step of:

dispersing said submicron polytetrafluoroethylene (PTFE) powder into a desired application system, with or without the addition of additives, wherein said application system may be aqueous or organic, and wherein the PTFE particles in said submicron polytetrafluoroethylene (PTFE) powder disperse to submicron size.

7. A method for producing submicron polytetrafluoroethylene (PTFE) powder comprising the following steps:

(a) selecting a PTFE starting material;

(b) irradiating said PTFE starting material at an intensity of from about 5 to about 120 megarads;

(c) adding the irradiated PTFE starting material to a solvent to form a mixture; and (d) grinding and/or de-agglomerating said mixture of said irradiated PTFE starting material and said solvent until the PTFE particles are submicron in size, wherein more than about 50% of said PTFE particles are less than 1.00 μm in size.

8. The method of claim 7 wherein said PTFE starting material is a member of the group consisting of a fine powder PTFE, a coagulated dispersion of PTFE, and a PTFE starting material formed as a result of emulsion polymerization.

9. The method of claim 7 wherein said addition of said irradiated PTFE starting material to the solvent takes place without the addition of any surfactant, wetting agent, rheology agent, or pH-adjusting agent.

10. The method according to claim 7, wherein said PTFE starting material comprises polytetrafluoroethylene or a polytetrafluoroethylene copolymer wherein the bulk of said copolymer material is polytetrafluoroethylene.

11. The method according to claim 7, further comprising the step of:

dispersing said submicron polytetrafluoroethylene (PTFE) mixture into a desired application system, with or without the addition of additives, wherein said application system may be aqueous or organic, and wherein the PTFE particles in said submicron polytetrafluoroethylene (PTFE) mixture disperse to submicron size.

12. A method for producing a submicron polytetrafluoroethylene (PTFE) dispersion comprising the following steps:

(a) selecting a PTFE starting material;

(b) irradiating said PTFE starting material at an intensity of from about 1 to about 50 megarads;

(c) adding said irradiated PTFE starting material to a resin, a polymer, a monomer, or a wax;

(d) dispersing said irradiated PTFE starting material with high intensity agitation using a mixing device, and wherein the PTFE particles disperse to submicron size.

13. The method of claim 12 wherein said PTFE starting material is a member of the group consisting of a fine powder PTFE, a coagulated dispersion of PTFE, and a PTFE starting material formed as a result of emulsion polymerization.

14. The method of claim 12 wherein the addition of said irradiated PTFE starting material to a resin, a polymer, a monomer, or a wax takes place without the addition of any surfactant, wetting agent, rheology agent, or pH-adjusting agent.

15. The method of claim 12 wherein the mixing device is selected from the group consisting of a single screw melt extruder, a twin screw melt extruder, a multi-screw melt extruder, a banburry mixer and a dispersion mixer.

16. A polytetrafluoroethylene (PTFE) powder formed according to the method of claim 1 or 7, wherein said polytetrafluoroethylene (PTFE) powder is free-flowing, readily dispersible, non-agglomerating, not sticky, and does not exhibit fibrillation.

17. A composition comprising dispersed submicron polytetrafluoroethylene (PTFE) formed according to claim 6, 11, or 12, wherein said composition is stable, non-agglomerating and wherein more than about 50% of the PTFE particles in said dispersion are below 1.00 μm in size.

* * * * *